United States Patent
Zheng et al.

(10) Patent No.: US 11,960,605 B2
(45) Date of Patent: *Apr. 16, 2024

(54) DYNAMIC ANALYSIS TECHNIQUES FOR APPLICATIONS

(71) Applicant: Palo Alto Networks, Inc., Santa Clara, CA (US)

(72) Inventors: Cong Zheng, San Jose, CA (US); Wenjun Hu, Santa Clara, CA (US); Zhi Xu, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,715

(22) Filed: Nov. 21, 2022

(65) Prior Publication Data

US 2023/0078962 A1    Mar. 16, 2023

Related U.S. Application Data

(63) Continuation of application No. 17/168,007, filed on Feb. 4, 2021, which is a continuation of application
(Continued)

(51) Int. Cl.
G06F 21/56  (2013.01)
G06F 11/34  (2006.01)
G06F 21/53  (2013.01)

(52) U.S. Cl.
CPC ............ *G06F 21/566* (2013.01); *G06F 21/53* (2013.01); *G06F 21/562* (2013.01); *G06F 11/3414* (2013.01); *G06F 2221/033* (2013.01)

(58) Field of Classification Search
CPC ...... G06F 21/566; G06F 21/53; G06F 21/562; G06F 11/3414; G06F 2221/033
See application file for complete search history.

(56) References Cited

U.S. PATENT DOCUMENTS 5,983,348 A    11/1999   Ji
6,192,444 B1    2/2001   White
(Continued)

FOREIGN PATENT DOCUMENTS

WO    2012134584    10/2012
WO    2013067505    5/2013
(Continued)

OTHER PUBLICATIONS

Shabtai et al., Andromaly: A Behavioral Malware Detection Framework for Android Devices, J Intell Inf Syst (2012) 38:161-190, Springer, Jan. 6, 2011.
(Continued)

*Primary Examiner* — Christopher A Revak
(74) *Attorney, Agent, or Firm* — Van Pelt, Yi & James LLP

(57) ABSTRACT

A sample is analyzed to determine a set of events that should be selected for performing by a dynamic analyzer executing the sample in an instrumented, emulated environment. The set of selected events is performed. In some cases, at least one emulator detection resistance action is performed. A maliciousness verdict is determined for the sample based at least in part on one or more responses taken by the sample in response to the set of selected events being performed by the dynamic analyzer.

28 Claims, 16 Drawing Sheets

Related U.S. Application Data

No. 16/024,515, filed on Jun. 29, 2018, now Pat. No. 10,956,573.

(56) References Cited

U.S. PATENT DOCUMENTS

| | | |
|---|---|---|
| 7,366,652 B2 | 4/2008 | Wang |
| 7,409,718 B1 | 8/2008 | Hong |
| 7,475,002 B1 | 1/2009 | Mann |
| 7,496,963 B2 | 2/2009 | Shipp |
| 7,568,233 B1 | 7/2009 | Szor |
| 7,603,713 B1 | 10/2009 | Belov |
| 7,649,838 B2 | 1/2010 | Fishteyn |
| 7,664,855 B1 | 2/2010 | Freed |
| 7,779,472 B1 | 8/2010 | Lou |
| 7,805,379 B1 | 9/2010 | Adkins, III |
| 7,823,202 B1 | 10/2010 | Nucci |
| 7,870,610 B1 | 1/2011 | Mitchell |
| 7,930,273 B1 | 4/2011 | Clark |
| 7,945,908 B1 | 5/2011 | Waldspurger |
| 7,958,555 B1 | 6/2011 | Chen |
| 8,011,010 B2 | 8/2011 | Michael |
| 8,141,132 B2 | 3/2012 | Oliver |
| 8,151,352 B1 | 4/2012 | Novitchi |
| 8,201,246 B1 | 6/2012 | Wu |
| 8,209,680 B1 | 6/2012 | Le |
| 8,225,317 B1 | 7/2012 | Chiueh |
| 8,239,492 B2 | 8/2012 | Pottenger |
| 8,239,608 B1 | 8/2012 | Ginzton |
| 8,260,914 B1 | 9/2012 | Ranjan |
| 8,291,468 B1 | 10/2012 | Chickering |
| 8,316,440 B1 | 11/2012 | Hsieh |
| 8,321,936 B1 | 11/2012 | Green |
| 8,347,100 B1 | 1/2013 | Thornewell |
| 8,359,651 B1 | 1/2013 | Wu |
| 8,364,664 B2 | 1/2013 | Bennett |
| 8,370,938 B1 | 2/2013 | Daswani |
| 8,402,529 B1 | 3/2013 | Green |
| 8,402,543 B1 | 3/2013 | Ranjan |
| 8,407,324 B2 | 3/2013 | McDougal |
| 8,438,639 B2 | 5/2013 | Jin |
| 8,443,363 B1 | 5/2013 | Brennan, III |
| 8,443,449 B1 | 5/2013 | Fan |
| 8,464,341 B2 | 6/2013 | Cohen |
| 8,479,295 B2 | 7/2013 | Sahita |
| 8,484,732 B1 | 7/2013 | Chen |
| 8,484,739 B1 | 7/2013 | Seshadri |
| 8,495,742 B2 | 7/2013 | Abadi |
| 8,510,827 B1 | 8/2013 | Leake |
| 8,516,591 B2 | 8/2013 | Fly |
| 8,521,667 B2 | 8/2013 | Zhu |
| 8,533,842 B1 | 9/2013 | Satish |
| 8,539,577 B1 | 9/2013 | Stewart |
| 8,566,928 B2 | 10/2013 | Dagon |
| 8,566,946 B1 | 10/2013 | Aziz |
| 8,572,740 B2 | 10/2013 | Mashevsky |
| 8,578,481 B2 | 11/2013 | Rowley |
| 8,584,239 B2 | 11/2013 | Aziz |
| 8,631,489 B2 | 1/2014 | Antonakakis |
| 8,646,071 B2 | 2/2014 | Pereira |
| 8,646,088 B2 | 2/2014 | Pistoia |
| 8,656,491 B1 | 2/2014 | Daswani |
| 8,677,487 B2 | 3/2014 | Balupari |
| 8,683,584 B1 | 3/2014 | Daswani |
| 8,707,441 B1 | 4/2014 | Cidambi |
| 8,726,386 B1 | 5/2014 | McCorkendale |
| 8,756,691 B2 | 6/2014 | Nachenberg |
| 8,763,071 B2 | 6/2014 | Sinha |
| 8,763,125 B1 | 6/2014 | Feng |
| 8,806,647 B1 | 8/2014 | Daswani |
| 8,813,240 B1 | 8/2014 | Northup |
| 8,826,426 B1 | 9/2014 | Dubey |
| 8,838,570 B1 | 9/2014 | English |
| 8,863,288 B1 | 10/2014 | Savage |
| 8,893,124 B2 | 11/2014 | Bork |
| 8,931,088 B2 | 1/2015 | Chen |
| 8,966,625 B1 | 2/2015 | Zuk |
| 9,003,526 B2 | 4/2015 | El-Moussa |
| 9,049,221 B1 | 6/2015 | Yen |
| 9,117,079 B1 | 8/2015 | Huang |
| 9,141,801 B2 | 9/2015 | Moon |
| 9,152,694 B1 | 10/2015 | Padidar |
| 9,165,142 B1 | 10/2015 | Sanders |
| 9,183,383 B1 | 11/2015 | Yablokov |
| 9,213,838 B2 | 12/2015 | Lu |
| 9,223,962 B1 | 12/2015 | Kashyap |
| 9,245,121 B1 | 1/2016 | Luo |
| 9,294,486 B1 | 3/2016 | Chiang |
| 9,317,680 B2 | 4/2016 | Carter, III |
| 9,349,134 B1 | 5/2016 | Adams |
| 9,355,246 B1 * | 5/2016 | Wan ............ G06F 21/566 |
| 9,361,089 B2 | 6/2016 | Bradfield |
| 9,516,039 B1 | 12/2016 | Yen |
| 9,516,053 B1 | 12/2016 | Muddu |
| 9,519,781 B2 | 12/2016 | Golshan |
| 9,591,003 B2 | 3/2017 | Johansson |
| 9,626,509 B1 | 4/2017 | Khalid |
| 9,792,430 B2 | 10/2017 | Golshan |
| 9,852,290 B1 | 12/2017 | Kirk |
| 9,894,096 B1 | 2/2018 | Daswani |
| 9,910,992 B2 | 3/2018 | Simpson |
| 9,917,855 B1 * | 3/2018 | Li ............ H04L 63/1408 |
| 10,019,575 B1 | 7/2018 | Wang |
| 10,140,303 B1 | 11/2018 | Patterson |
| 10,445,216 B2 | 10/2019 | Mola |
| 10,534,687 B2 | 1/2020 | Fahim |
| 10,534,749 B1 | 1/2020 | Miah |
| 10,621,348 B1 * | 4/2020 | Ciubotariu ............ G06F 21/566 |
| 10,956,573 B2 | 3/2021 | Zheng |
| 11,010,474 B2 | 5/2021 | Hu |
| 11,132,443 B1 * | 9/2021 | Raber ............ G06F 21/566 |
| 11,194,915 B2 | 12/2021 | Stolfo |
| 2003/0191911 A1 | 10/2003 | Kleinschnitz |
| 2004/0030913 A1 | 2/2004 | Liang |
| 2004/0107416 A1 | 6/2004 | Buban |
| 2004/0133796 A1 | 7/2004 | Cohen |
| 2005/0149726 A1 | 7/2005 | Joshi |
| 2005/0177602 A1 | 8/2005 | Kaler |
| 2005/0240756 A1 | 10/2005 | Mayer |
| 2005/0283837 A1 | 12/2005 | Olivier |
| 2006/0021029 A1 | 1/2006 | Brickell |
| 2006/0168024 A1 | 7/2006 | Mehr |
| 2007/0039053 A1 | 2/2007 | Dvir |
| 2007/0050850 A1 | 3/2007 | Katoh |
| 2007/0055711 A1 | 3/2007 | Polyakov |
| 2007/0079375 A1 | 4/2007 | Copley |
| 2007/0106986 A1 | 5/2007 | Worley, Jr. |
| 2007/0174915 A1 | 7/2007 | Gribble |
| 2007/0192857 A1 | 8/2007 | Ben-Itzhak |
| 2007/0219772 A1 | 9/2007 | Kfir |
| 2007/0261112 A1 | 11/2007 | Todd |
| 2008/0016552 A1 | 1/2008 | Hart |
| 2008/0049027 A1 | 2/2008 | Hauke |
| 2008/0127338 A1 | 5/2008 | Cho |
| 2008/0155694 A1 | 6/2008 | Kwon |
| 2008/0177755 A1 | 7/2008 | Stern |
| 2008/0177994 A1 | 7/2008 | Mayer |
| 2008/0209562 A1 | 8/2008 | Szor |
| 2008/0229393 A1 | 9/2008 | Congdon |
| 2008/0256633 A1 | 10/2008 | Arnold |
| 2008/0262991 A1 | 10/2008 | Kapoor |
| 2008/0263658 A1 | 10/2008 | Michael |
| 2008/0263659 A1 | 10/2008 | Alme |
| 2008/0320594 A1 | 12/2008 | Jiang |
| 2009/0007100 A1 | 1/2009 | Field |
| 2009/0019547 A1 | 1/2009 | Palliyil |
| 2009/0036111 A1 | 2/2009 | Danford |
| 2009/0055928 A1 | 2/2009 | Kang |
| 2009/0077383 A1 | 3/2009 | De Monseignat |
| 2009/0144826 A2 | 6/2009 | Piccard |
| 2009/0150419 A1 | 6/2009 | Kim |
| 2009/0235357 A1 | 9/2009 | Ebringer |
| 2009/0241190 A1 | 9/2009 | Todd |
| 2009/0254989 A1 | 10/2009 | Achan |
| 2009/0265786 A1 | 10/2009 | Xie |

(56) References Cited

U.S. PATENT DOCUMENTS

| | | |
|---|---|---|
| 2009/0282485 A1 | 11/2009 | Bennett |
| 2009/0288167 A1 | 11/2009 | Freericks |
| 2010/0037314 A1 | 2/2010 | Perdisci |
| 2010/0043072 A1 | 2/2010 | Rothwell |
| 2010/0077481 A1 | 3/2010 | Polyakov |
| 2010/0107252 A1 | 4/2010 | Mertoguno |
| 2010/0115586 A1 | 5/2010 | Raghavan |
| 2010/0154059 A1 | 6/2010 | McNamee |
| 2010/0162350 A1 | 6/2010 | Jeong |
| 2010/0175132 A1 | 7/2010 | Zawadowskiy |
| 2010/0281458 A1 | 11/2010 | Paladino |
| 2010/0333168 A1 | 12/2010 | Herrod |
| 2011/0041179 A1 | 2/2011 | Stahlberg |
| 2011/0055923 A1 | 3/2011 | Thomas |
| 2011/0090911 A1 | 4/2011 | Hao |
| 2011/0099620 A1 | 4/2011 | Stavrou |
| 2011/0161955 A1 | 6/2011 | Woller |
| 2011/0167494 A1* | 7/2011 | Bowen .................... G06F 21/56 726/24 |
| 2011/0167495 A1 | 7/2011 | Antonakakis |
| 2011/0173698 A1 | 7/2011 | Polyakov |
| 2011/0185425 A1 | 7/2011 | Lee |
| 2011/0208714 A1 | 8/2011 | Soukal |
| 2011/0239299 A1 | 9/2011 | Chen |
| 2011/0252474 A1 | 10/2011 | Ward |
| 2011/0271342 A1 | 11/2011 | Chung |
| 2011/0276695 A1 | 11/2011 | Maldaner |
| 2011/0283360 A1 | 11/2011 | Abadi |
| 2011/0296412 A1 | 12/2011 | Banga |
| 2011/0296486 A1 | 12/2011 | Burch |
| 2012/0042381 A1 | 2/2012 | Antonakakis |
| 2012/0054869 A1 | 3/2012 | Yen |
| 2012/0079596 A1 | 3/2012 | Thomas |
| 2012/0084860 A1 | 4/2012 | Cao |
| 2012/0089700 A1 | 4/2012 | Safruti |
| 2012/0096549 A1 | 4/2012 | Amini |
| 2012/0110174 A1 | 5/2012 | Wootton |
| 2012/0117650 A1 | 5/2012 | Nachenberg |
| 2012/0117652 A1 | 5/2012 | Manni |
| 2012/0192274 A1 | 7/2012 | Odom |
| 2012/0233691 A1 | 9/2012 | Jiang |
| 2012/0240183 A1 | 9/2012 | Sinha |
| 2012/0240224 A1 | 9/2012 | Payne |
| 2012/0255018 A1 | 10/2012 | Sallam |
| 2012/0255019 A1 | 10/2012 | McNamee |
| 2012/0255021 A1 | 10/2012 | Sallam |
| 2012/0255031 A1 | 10/2012 | Sallam |
| 2012/0278889 A1 | 11/2012 | El-Moussa |
| 2012/0291042 A1 | 11/2012 | Stubbs |
| 2012/0291131 A1 | 11/2012 | Turkulainen |
| 2013/0007245 A1 | 1/2013 | Malik |
| 2013/0014259 A1 | 1/2013 | Gribble |
| 2013/0047147 A1 | 2/2013 | McNeill |
| 2013/0055394 A1 | 2/2013 | Beresnevichiene |
| 2013/0091350 A1 | 4/2013 | Gluck |
| 2013/0091570 A1 | 4/2013 | McCorkendale |
| 2013/0091571 A1 | 4/2013 | Lu |
| 2013/0104230 A1 | 4/2013 | Tang |
| 2013/0117848 A1 | 5/2013 | Golshan |
| 2013/0117852 A1 | 5/2013 | Stute |
| 2013/0122861 A1 | 5/2013 | Kim |
| 2013/0145002 A1 | 6/2013 | Kannan |
| 2013/0145008 A1 | 6/2013 | Kannan |
| 2013/0152200 A1 | 6/2013 | Alme |
| 2013/0160130 A1 | 6/2013 | Mendelev |
| 2013/0191915 A1 | 7/2013 | Antonakakis |
| 2013/0212684 A1 | 8/2013 | Li |
| 2013/0227165 A1 | 8/2013 | Liu |
| 2013/0232574 A1 | 9/2013 | Carothers |
| 2013/0246685 A1 | 9/2013 | Bhargava |
| 2013/0298184 A1 | 11/2013 | Ermagan |
| 2013/0298192 A1 | 11/2013 | Kumar |
| 2013/0298230 A1 | 11/2013 | Kumar |
| 2013/0298242 A1 | 11/2013 | Kumar |
| 2013/0298243 A1 | 11/2013 | Kumar |
| 2013/0298244 A1 | 11/2013 | Kumar |
| 2013/0326625 A1 | 12/2013 | Anderson |
| 2013/0347094 A1 | 12/2013 | Bettini |
| 2014/0006734 A1 | 1/2014 | Li |
| 2014/0059641 A1 | 2/2014 | Chapman, II |
| 2014/0096131 A1 | 4/2014 | Sonnek |
| 2014/0130158 A1 | 5/2014 | Wang |
| 2014/0189862 A1 | 7/2014 | Kruglick |
| 2014/0283037 A1 | 9/2014 | Sikorski |
| 2014/0337836 A1 | 11/2014 | Ismael |
| 2014/0351935 A1 | 11/2014 | Shao |
| 2014/0380474 A1 | 12/2014 | Paithane |
| 2015/0047033 A1 | 2/2015 | Thomas |
| 2015/0058984 A1 | 2/2015 | Shen |
| 2015/0067673 A1 | 3/2015 | Wang |
| 2015/0067862 A1 | 3/2015 | Yu |
| 2015/0074810 A1 | 3/2015 | Saher |
| 2015/0086115 A1 | 3/2015 | Danko |
| 2015/0096025 A1 | 4/2015 | Ismael |
| 2015/0195299 A1 | 7/2015 | Zoldi |
| 2015/0199207 A1 | 7/2015 | Lin |
| 2015/0278853 A1 | 10/2015 | McLaughlin |
| 2016/0036836 A1 | 2/2016 | Grill |
| 2016/0099951 A1 | 4/2016 | Kashyap |
| 2016/0342787 A1 | 11/2016 | Wang |
| 2017/0093910 A1 | 3/2017 | Gukal |
| 2017/0322637 A1 | 11/2017 | Cheng |
| 2017/0323102 A1 | 11/2017 | Manadhata |
| 2018/0121659 A1 | 5/2018 | Sawhney |
| 2018/0165451 A1* | 6/2018 | Kawakita ................ G06F 9/455 |
| 2020/0004963 A1* | 1/2020 | Zheng ..................... G06F 21/53 |
| 2020/0019424 A1 | 1/2020 | Wang |
| 2020/0244678 A1 | 7/2020 | Shua |
| 2020/0311268 A1* | 10/2020 | Kostyushko .......... G06F 21/561 |
| 2020/0358819 A1 | 11/2020 | Bowditch |
| 2020/0394299 A1 | 12/2020 | Urias |
| 2021/0084054 A1* | 3/2021 | Young ................... H04L 63/145 |
| 2022/0116411 A1* | 4/2022 | Melicher ............ H04L 63/0263 |
| 2022/0129355 A1 | 4/2022 | Botelho |
| 2022/0269796 A1* | 8/2022 | Chase ................. H04L 63/0861 |

FOREIGN PATENT DOCUMENTS

| | | |
|---|---|---|
| WO | 2013067508 | 5/2013 |
| WO | 2013134206 | 9/2013 |

OTHER PUBLICATIONS

Sikorski et al., 'Chapter 14: Malware-Focused Network Signatures,' Practical Malware Anlaysis, No Starch Press, Feb. 2012, 13 pages.

Singh et al., 'Hot Knives Through Butter: Evading File-based Sandboxes', FireEye, Inc., Feb. 2014.

Spreitzenbarth et al., "Mobile-Sandbox: Having a Deeper Look into Android Applications", from Proceedings of the 28th Annual ACM Symposium on Applied Computing, pp. 1808-1815, Mar. 2013.

Strayer et al. Detecting Botnets with Tight Command and Control, BBN Technologies, 2006.

Sun et al, Malware Virtualization-resitant behavior detection, 2011 IEEE, pp. 912-917.

Sylve et al., "Acquisition and analysis of volatile memory from android devices." Digital Investigation 8.3-4, pp. 175-184. 2012.

Van Der Heide et al., 'DNS Anomaly Detection,' System and Network Engineering Research Group, University of Amsterdam, Feb. 6, 2011, 20 pages.

Wagener et al., 'An Instrumented Analysis of Unknown Software and Malware Driven by Free Libre Open Source Software', Signal Image Technology and Internet Based Systems, 2008. SITIS'08. IEEE International Conference on. IEEE, Nov. 2008.

Yadav et al., Detecting Algorithmically Generated Domain-Flux Attacks with DNS Traffic Analysis, 2012, pp. 1-15.

Yadav et al., 'Detecting Algorithmically Generated Malicious Domain Names', Nov. 2010.

Yen, Ting-Fang et al., Traffic Aggregation for Malware Detection, Jul. 2008.

Yin et al., Panorama: Capturing System-Wide Information Flow for Malware Detection and Analysis, CCS'Oct. 29-Nov. 2, 2007, ACM, pp. 116-127.

(56) References Cited

OTHER PUBLICATIONS

Zang et al., Botnet Detection Through Fine Flow Classification, CSE Dept., Technical Report No. CSE11-001, p. 1-17, Jan. 31, 2011.
Zheng et al., "SmartDroid: an Automatic System for Revealing UI-based Trigger Conditions in Android Applications", Oct. 19, 2012.
Zhou et al., Dissecting Android Malware: Characterization and Evolution, IEEE, 2012.
Zou et al., Detecting Malware Based on DNS Graph Mining, Hindawi Publishing Corporation, International Journal of Distributed Sensor Networks, vol. 2015, pp. 1-12, Apr. 17, 2015.
Author Unknown, A Day in the Life of a BotArmy, Damballa, 2008.
Author Unknown, Advanced Persistent Threats (APT), What's an APT? A Brief Definition, Damballa, Dec. 14, 2010.
Author Unknown, Anatomy of a Targeted Attack, Damballa, Dec. 3, 2008.
Author Unknown, AV, IDS/IPS and Damballa's Response to Targeted Attacks, A Technology Comparison, Damballa, Nov. 2008.
Author Unknown, Closed Window, How Failsafe Enhancements Dramatically Limit Opportunities for Malware Armies and other Targeted Attacks, Damballa, Sep. 23, 2009.
Author Unknown, Damballa: A Different Approach, Targeted Attacks Requires a New Solution, Damballa, Sep. 23, 2008.
Author Unknown, Damballa's in-the-Cloud Security Model, Enterprise Protection Moves Beyond the Network Perimeter, Damballa, Aug. 24, 2008.
Author Unknown, Executive Overview, The Command Structure of the Aurora Botnet, Damballa, Mar. 2010.
Author Unknown, FireEye Malware Analysis, FireEye.com, FireEye, Inc., 2010.
Author Unknown, How to Be a Hero in the War Against BotArmies, Damballa, 2008.
Author Unknown, 'Hybrid Sandboxing for Detecting and Analyzing Advanced and Unknown Malware', Blue Coat Systems, Inc., Nov. 2013.
Author Unknown, Layer 8, How and Why Targeted Attacks Exploit Your Users, Damballa, Nov. 2011.
Author Unknown, 'Multi-Vector Virtual Execution (MVX) Engine', FireEye, Inc., http://www.fireeye.com/products-and-solutions/virtual-execution-engine.html, Jun. 2014.
Author Unknown, Targeted Attacks for Fun and Profit, an Executed Guide to a New and Growing Enterprise Threat, Damballa, Oct. 13, 2008.
Author Unknown, Trust Betrayed, What to Do When a Targeted Attack Turns Your Networks Against You, Damballa, Feb. 22, 2008.
Author Unknown, Updated on the Enemy, a Deconstruction of Who Profits From Botnets, Damballa, May 13, 2009.
Barr, The VMware Mobile Virtualization Platform: Is that a Hypervisor in your Pocket?, Dec. 2010, VMware, p. 124-135.
Binkley et al., An Algorithm for Anomaly-based Botnet Detection, Jul. 2006.
Blasing et al., An Android Application Sandbox System for Suspicious Software Detection, Malicious and Unwanted Software (MALWARE), 2010 5th International Conferences on IEEE, 2010.
Chen et al., Chapter 4: Guarding Against Network Intrusions, Network and System Security, Elsevier Inc., Feb. 2009, 5 pages.
Chen et al., Software-Defined Mobile Networks Security, Mobile Netw Appl, (2016), 21:729-743, Jan. 9, 2016.
Davidoff et al., 'Chapter 12: Malware Forensics,' Network Forensics: Tracking Hackers Through Cyberspace, Pearson Education Inc., Jun. 2012, 60 pages.
Dittrich et al., P2P as Botnet Command and Control; A Deeper Insight, 2008 3rd International Conference on Malicious and Unwanted Software (Malware), Oct. 2008, IEEE, vol. 10, pp. 41-48.
Giroire et al., Exploiting Temporal Persistence to Detect Convert Botnet Channels, Sep. 2009.
Goebel et al., Rishi: Identify Bot Contaminated Hosts by IRC Nickname Evaluation, Apr. 2007.
Gu et al., BotHunter: Detecting Malware Infection Through IDS-Driven Dialog Correlation, Aug. 2007.
Gu et al., BotMiner: Clustering Analysis of Network Traffic for Protocol- and Structure-Independent Botnet Detection, Jul. 2008.
Gu et al., BotSniffer: Detecting Botnet Command and Control Channels in Network Traffic, Feb. 2008.
Gunter Ollmann, Botnet Communication Topologies, Understanding the Intricacies of Bonet Command and Control, Damballa, Jun. 2009.
Gunter Ollmann, Extracting CnC from Malware, The Role of malware Sample Analysis in Botnet Detection, Damballa, Dec. 8, 2009.
Gunter Ollmann, Serial Variant Evasion Tactics, Techniques Used to Automatically Bypass Antivirus Technologies, Damballa, Oct. 7, 2009.
Gunter Ollmann, The Botnet vs. Malware Relationship, The One to one Botnet Myth, Damballa, Jun. 2009.
Gunter Ollmann, The Opt-IN Botnet Generation, Hacktivism and Centrally Controlled Protesting, Social Networks, Damballa, Apr. 26, 2010.
Karagiannis et al., BLINC: Multilevel Traffic Classification in the Dark, ACM SIGCOMM Computer Communication Review, Retrieved From https://www.microsoft.com/en-us/research/wp-content/uploads/2016/02/BLING_TR.pdf, published 2005.
Karasaridis, Anestis et al., Wide-scale Botnet Detection and Characterization, Dec. 14, 2010.
Landecki, Grzegorz, Detecting Botnets, Linux Journal, Jan. 1, 2009.
Lau et al., 'Measuring Virtual Machine Detection in Malware using DSD Tracer', Sophoslabs, Journal in Computer Virology, Aug. 2008.
Li et al., "DroidBot: A Lightweight UI-Guided Test Input Generator for Android", 2017.
Ligh et al., 'Chapter 5: Researching Domains and IP Addresses,' Malware Analyst's Cookbook, John Wiley & Sons, Nov. 2010, 38 pages.
Lindorfer et al., 'Detecting Enviroment-Sensitive Malware', Recent Advances in Intrusion Detection. Springer Berlin Heidelberg, Jan. 2011.
Liu et al., An Automatic UI Interaction Script Generator for Android Applications Using Activity Call Graph Analysis. EURASIA Journal of Mathematics, Science and Technology Education, 14(7), 3159-3179. 2018.
Livadas et al., Using Machine Learning Techniques to Identify Botnet Traffic, BBN Technologies, Nov. 2006.
Min et al., Runtime-Based Behavior Dynamic Analysis System for Android Malware Detection, Atlantis Press, ICCIA 2012, Dec. 2012.
Nazario et al., As the Net Churns: Fast-Flux Botnet Observations, IEEE, pp. 24-31, Sep. 5, 2008.
Paul Royal, Analysis of the Kraken Botnet, Damballa, Apr. 9, 2008.
Rajab et al., 'A Multifaceted Approach to Understanding the Botnet Phenonmenon,' Proceedings of the 6th ACM SIGCOMM Conference on Internet Measurement, Oct. 2006, 12 pages.
Ramachandran, Anirudh et al., Revealing Botnet Membership Using DNSBL Counter-Intelligence, Jul. 7, 2006.
Rastogi et al., AppsPlayground: Automatic Security Analysis of Smartphone Applications, ACM, Feb. 2013.
Russ White, 'High Availability in Routing', Mar. 2004, Cisco Systems, vol. 7, Issue 1, pp. 2-14.
Schechter et al., 'Fast Detection of Scanning Worm Infections,' Recent Advances in Intrusion Detection: 7th International Symposium RAID 2004 Proceedings, Jan. 2004, 24 pages.

* cited by examiner

```
.smali
---android
------annotation
---com
------android
---------vending
------------billing         ⎫
------google                ⎬ 502
---------ads                ⎪
---------android            ⎪
------------gcm             ⎭
-----h2                     ⎫
--------org                 ⎬ 504
-----------springframework  ⎪
---------util               ⎭
-----jumptap   ⎫ 506
--------adtag  ⎭
-----greystripe ─── 508
-----burstly ─── 510
-----flurry ─── 512
-----inmobi ─────── 514
-----millennialmedia ─── 516
-----ACMEGames ─── 518
--org                       ⎫
-----springframework        ⎬ 520
-----codehaus  ⎫ 522
--------jackson ⎭
-----sneakystuff ─── 524
```

FIG. 5

```
public void sendTextMessage(
        String destinationAddress, String scAddress, String text,
        PendingIntent sentIntent, PendingIntent deliveryIntent) {
    if (TextUtils.isEmpty(destinationAddress)) {
        throw new IllegalArgumentException("Invalid destinationAddress");
    } if (TextUtils.isEmpty(text)) {
        throw new IllegalArgumentException("Invalid message body");
    } try {
        ISms iccISms = ISms.Stub.asInterface(ServiceManager.getService("isms"));
        if (iccISms != null) {
            iccISms.sendText(ActivityThread.currentPackageName(), destinationAddress,
                        scAddress, text, sentIntent, deliveryIntent);
        }
    } catch (RemoteException ex) {
        // ignore it
    }
}
```

FIG. 8A

```
public void sendTextMessage(
        String destinationAddress, String scAddress, String text,
        PendingIntent sentIntent, PendingIntent deliveryIntent) {
    if (TextUtils.isEmpty(destinationAddress)) {
        throw new IllegalArgumentException("Invalid destinationAddress");
    } if (TextUtils.isEmpty(text)) {
        throw new IllegalArgumentException("Invalid message body");
    }
```
                    804 ─╮                                                    ┌─ 802
```
    ┌─────────────────────────────────────────────────────────────────────────────────┐
    │ if(PanHookerUtil. isNeedLog()){                                                 │
    │     PanLogInfo panLogInfo = new PanLogInfo("android.telephony.SmsManager", "sendTextMessage"); │
    │     panLogInfo.init();                                                          │
    │     panLogInfo.put("destinationAddress", destinationAddress);                   │
    │     panLogInfo.put("data", text);                                               │
    │     PanHookerUtil. logLongMsg(panLogInfo);                                      │
    │ }                                                                               │
    └─────────────────────────────────────────────────────────────────────────────────┘ try {
        ISms iccISms = ISms.Stub.asInterface(ServiceManager.getService("isms"));
        if (iccISms != null) {
            iccISms.sendText(ActivityThread.currentPackageName(), destinationAddress,
                    scAddress, text, sentIntent, deliveryIntent);
        }
    } catch (RemoteException ex) {
        // ignore it
    }
}
```

FIG. 8B

```
class Screen:
    def __init__ (self, screen_id):

self.screen_id = screen_id
        self.top_activity = screen_id.split('+')[0]
        self.top_window_id = screen_id.split('+')[1]

self.views = □
        self.edit_views = □
        self.click_views = □
        self.priority_click_views = □
        self.text_views = □
        self.radio_views = □
        self.actiontab_views = □
```

FIG. 9

```
class TouchEvent(Event Factory):
    def _init_(self, view):
        EventFactory._init_(self)
        self.view = view def play(self):
        if not self.view:
            return
        self.view.touch()

class KeyEvent(EventFactory):
    def _init_(self, key_type, device):
        EventFactory._init_(self)
        self.key_type = key_type
        self.device = device def play(self):
        if not self.device:
            return
        self.device.press(self.key_type)

class InputEvent(EventFactory):
    def _init_(self, input_content. device):
        EventFactory._init_(self)
        self.input_content = input_content
        self.device = device def play(self):
        if not self.device:
            return
        self.device.type(self.input_content)

class DragEvent(EventFactory):
    def _init_(self, device):
        EventFactory._init_(self)
        self.device = device def drag_in_area(self, view):
        if not view or not self, device:
            return
        display = view.get_display_info()
        x1 = random.uniform(0, display['width'])
        y1 = random.uniform(0, display['height'])
        x2 = random.uniform(0, display['width'])
        y2 = random.uniform(0, display['height'])
        self.device.drag((x1, y1), (x2, y2))
```

FIG. 10

```
<receiver android:name="com.ast.sdk.receiver.ReceiverM">
    <intent-filter android:priority="1000">
        <action android:name="com.diamondsks.jaaakfd.com.mo.action.ACTION"/>
        <action android:name="android.intent.action.USER_PRESENT"/>
    </intent-filter>
</receiver>
<receiver android:name="com.secure360.system.SReceiver"/>
<service android:exported="true" android:name="com.secure360.system.SService" android:process=":es"/>
<meta-data android:name="YQWY_PAY_APPID" android:value="49"/>
<meta-data android:name="YQWY_PAY_CHANNELID" android:value="ypan"/>
<receiver android:name="com.yf.jar.pay.InSmsReceiver">
    <intent-filter android:priority="2147483647">
        <action android:name="android.provider.Telephony.SMS_RECEIVED"/>
    </intent-filter>
</receiver>
<service android:name="com.yf.jar.pay.SmsServices"/>
<service android:name="com.yf.sms.service.InitService"/>
```

FIG. 11

```
                      ┌─────────────────────────────────────────────────────┐
                      │ Analyze a sample to determine a set of events that  │  ⎫ 1202
                      │ should be selected for performing by a dynamic      │  ⎬
                      │ analyzer executing a sample in an instrumented,     │  ⎭
                      │ emulated environment.                               │
                      └─────────────────────────────────────────────────────┘
                                              │
                                              ▼
                      ┌─────────────────────────────────────────────────────┐
                      │                                                     │  ⎫ 1204
                      │          Perform the set of selected events.        │  ⎬
                      │                                                     │  ⎭
                      └─────────────────────────────────────────────────────┘
                                              │
                                              ▼
                      ┌─────────────────────────────────────────────────────┐
                      │ Determine a maliciousness verdict for the sample    │  ⎫ 1206
                      │ based at least in part on one or more responses     │  ⎬
                      │ taken by the sample in response to the set of       │  ⎭
                      │ selected events being performed.                    │
                      └─────────────────────────────────────────────────────┘
```

```
public String getLine1Number() {
    // PAN LOG
                                                            ┌─1302
    ┌─────────────────────────────────────────────────────────┐
    │ if (PanHookerUtil.isNeedLog()){                         │
    │     PanLogInfo panLogInfo = new PanLogInfo("android.telephony. TelephonyManager"│
    │     "getLine1Number");                                  │
    │     panLogInfo.init();                                  │
    │                                                         │
    │     String result = hideEmu("getLine1Number");          │
    │     panLogInfo.put("return", result);                   │
    │     PanHookerUtil.logLongMsg(panLogInfo);               │
    │     return result;                                      │
    │ }                                                       │
    └─────────────────────────────────────────────────────────┘ try {
            return getSubscriberInfo().getLine1Number();
    } catch (RemoteException ex) {
            return null;
    } catch (NullPointerException ex) {
            // This could happen before phone restarts due to crashing
            return null;
        }
}
```

FIG. 13A

```
public String getDeviceId() {
    ┌─────────────────────────────────────────────────────────┐
    │ if (PanHookerUtil.isNeedLog()){                         │
    │     PanLogInfo panLogInfo = new PanLogInfo("android.telephony.TelephonyManager", "getDeviceId"│
    │     panLogInfo.init();                                  │
    │                                                         │
    │     String result = hideEmu("getDeviceId");             │
    │     panLogInfo.put("return", result);                   │
    │     PanHookerUtil.logLongMsg(panLogInfo):               │
    │     return result;                                      │
    │ }                                                       │
    └─────────────────────────────────────────────────────────┘
        try {
            return getSubscriberInfo().getDeviceId();
    } catch (RemoteException ex) {
            return null;
    } catch (NullPointerException ex) {
            return null;
        }
}
```

FIG. 13B

```
public boolean exists() {                    ┌─1402
    if(PanHookerUtil.isNeedLog()){
        String absPath = getAbsolutePath();
        if(PanHideEmulator.isTargetFile(absPath))
            return false;
        else
            return doAccess(F_OK);
    }else
        return doAccess(F_OK);
}
```

FIG. 14A

```
public static void setStaticObjectField(Class<?> clazz, String fieldName, Object value) {
    try {
        findField(clazz, fieldName).set(null, value);
    } catch (IllegalAccessException e) {
        throw new IllegalAccessError(e.getMessage());
    } catch (IllegalArgumentException e) {
        throw e;
    }
}
```

FIG. 14B

DYNAMIC ANALYSIS TECHNIQUES FOR APPLICATIONS

CROSS REFERENCE TO OTHER APPLICATIONS

This application is a continuation of U.S. patent application Ser. No. 17/168,007, entitled DYNAMIC ANALYSIS TECHNIQUES FOR APPLICATIONS filed Feb. 4, 2021, which is a continuation of U.S. patent application Ser. No. 16/024,515, now U.S. Pat. No. 10,956,573, entitled DYNAMIC ANALYSIS TECHNIQUES FOR APPLICATIONS filed Jun. 29, 2018, each of which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information), and/or gaining access to private/proprietary computer systems and/or computer networks. Malware can be in the form of code, scripts, active content, and/or other software. Further, individuals are increasingly spending more time using mobile devices and less time using traditional computers. This shift in usage is present both in personal and in business contexts. For example, employees of companies are increasingly using mobile devices for their work related activities. In conjunction with this shift in user behavior, nefarious individuals and organizations are increasingly targeting mobile devices with malware. Accordingly, there is an ongoing need for improvements to techniques for identifying and mitigating malware, including malware that targets mobile devices.

BRIEF DESCRIPTION OF THE DRAWINGS

Various embodiments of the invention are disclosed in the following detailed description and the accompanying drawings.

FIG. 5 illustrates an example representation of .smali information.

FIG. 8A illustrates an embodiment of a method for sending text messages.

FIG. 8B illustrates an embodiment of a method for sending text messages.

FIG. 9 illustrates an example data structure for storing UI elements and their layouts for a given screen view.

FIG. 10 illustrates example implementations of four different types of UI events.

FIG. 11 illustrates an example portion of an application's AndroidManifest.xml.

FIG. 12 illustrates an embodiment of a process for triggering malicious behavior in a sample that is executing in a virtualized environment.

FIG. 13A illustrates an example of a version of an API.

FIG. 13B illustrates an example of a version of an API.

FIG. 14A illustrates modification code that can be added to Android source code.

FIG. 14B illustrates an example way to dynamically change a field value in a given class.

DETAILED DESCRIPTION

Figure 1:
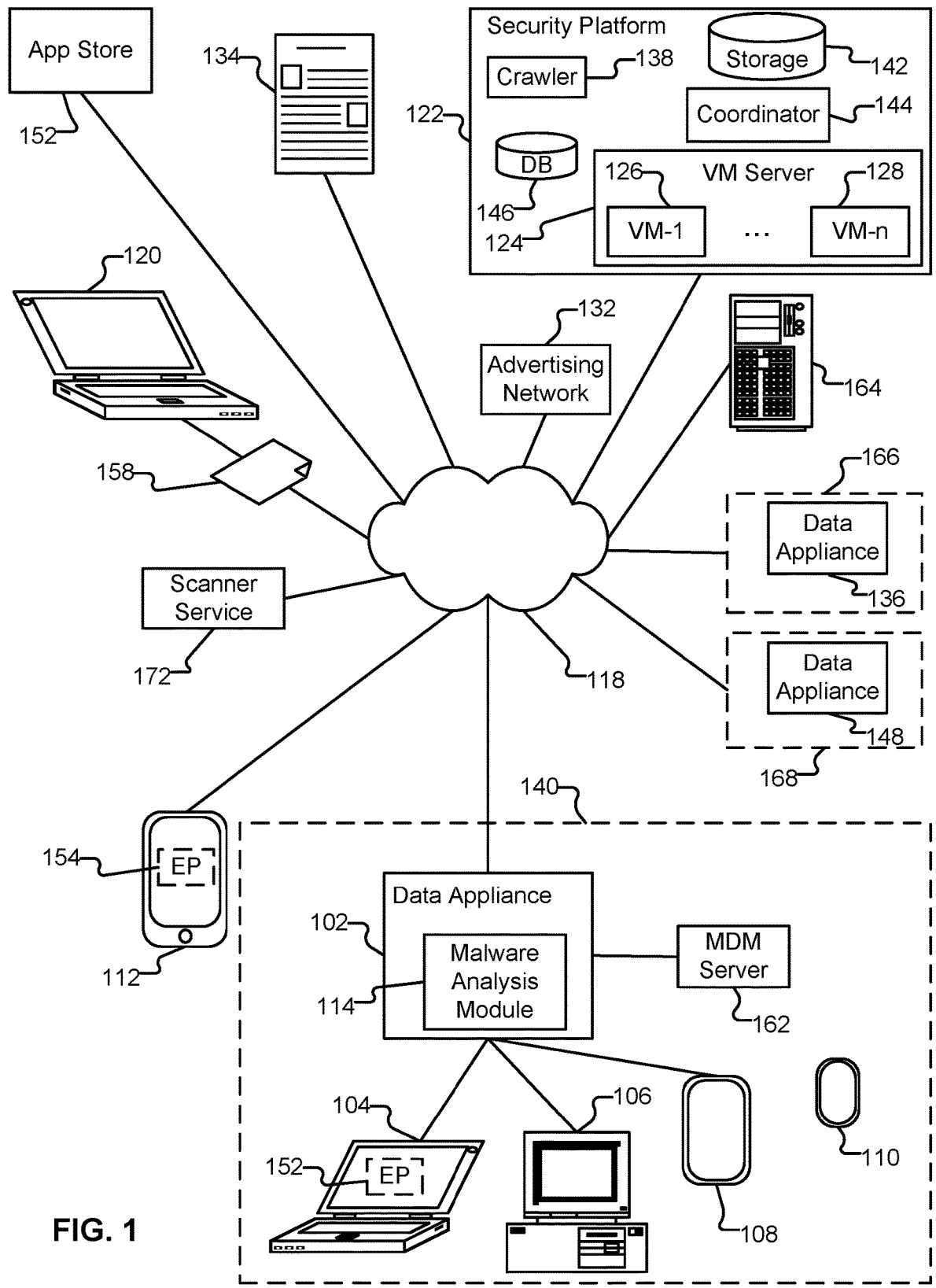
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as determined by cloud security service 122) can be variously shared and/or refined among various entities included in the environment shown in FIG. 1. And, using techniques described herein, such classifications can be used to protect devices, such as endpoint client devices, from such malware.

Suppose a nefarious individual wishes to propagate malware to end users. A variety of approaches can be used by the nefarious individual. As one example, the individual can upload malware to a software distribution platform such as platform 152 (also referred to as an "an app store"). The nefarious individual hopes that unsuspecting users of platform 152 will download the malicious application from platform 152 and install it on their devices. Another way the nefarious individual can attempt to propagate malware is by posting it on a message/forum site, such as website 134. In this scenario, the nefarious individual again hopes that unsuspecting users of website 134 will download and install the malicious application. Yet another way for the nefarious individual to attempt to propagate malware is to attach it to an email message and hope that the recipient will open the attachment and install the program. Yet another way for the nefarious individual to attempt to propagate malware is to include it in an advertising company's advertising network (e.g., advertising network 132) and hope that the user will install the promoted program. Yet another way for the nefarious individual to attempt to propagate malware is to include a download link for the malware within a phishing SMS message or email message and hope that the recipient will download the malware and install the program. Yet another way for the nefarious individual to attempt to propagate malware is to use software that is already installed on the target client device (e.g., causing the already installed software to install the malware on the client device).

Shown in FIG. 1 is an example enterprise network 140 which belongs to an entity hereinafter referred to as ACME Corporation. Included within enterprise network 140 are example client devices 104-110, which are a laptop computer, a desktop computer, a tablet, and a smartphone (respectively). Laptop 104 computer and desktop computer 106 are owned by ACME, and tablet 108 and smartphone 110 are personally owned by an ACME employee hereinafter referred to as Alice. Client device 112 is a smartphone located outside of enterprise network 140.

Client devices, such as client devices 104-112 can each execute a variety of applications. The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement software development kit (SDK) or library embedded within the calculator app). Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a legitimate navigation/map service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer.

Other forms of malware can also be mitigated using the techniques described herein (e.g., ransomware). And, while examples provided throughout the Specification generally refer to malicious applications, techniques described herein can also be used in various embodiments with respect to other kinds of applications (e.g., adware, goodware, etc.).

In some cases, an end user of an application (e.g., Alice) may approve of functionality provided by an application, while another entity (e.g., ACME) may not. As two examples, Alice may intentionally have gambling applications or pornographic-themed applications installed on her tablet 108. In contrast, ACME may have corporate policies prohibiting employees from using enterprise network 140 for such applications. As will be described in more detail below, ACME can enforce policies against the use of such applications within enterprise network 140.

Data appliance 102 (also included within enterprise network 140) is configured to enforce policies regarding communications between client devices, such as client devices 104 and 106, and nodes outside of enterprise network 140 (e.g., reachable via one or more external networks collectively depicted as network cloud 118). One example of a policy is a rule prohibiting any access to pornographic websites by any client inside enterprise network 140. Another example of a policy is a rule prohibiting access to social networking sites by clients between the hours of 9 am and 6 pm. Yet another example of a policy is a rule allowing access to video streaming websites, subject to a bandwidth or other consumption constraint. Yet another example of a policy is one that logs the time spent by employees using social networking sites (e.g., where there is an understanding that employees will sometimes visit such sites throughout the workday, but should limit such activities to fifteen minutes per day). Policies can be made to apply to all devices equally, and can also be applied at more granular levels. For example, access to social networking sites can be permitted to anyone in the ACME marketing department (e.g., users having associated group identifiers indicating their affiliation with the marketing department), and unfettered bandwidth for use with video streaming websites can be granted to specific users (e.g., the CEO), to groups of users (e.g., the ACME sales department), and/or to individual/groups of clients (e.g., prohibiting access to video streaming sites on production servers). Access to sites (e.g., a news site) can be explicitly permitted (e.g., a rule allowing access to a URL ("www.examplenews.com") or category ("NEWS")), and can also be permitted by virtue of not being prohibited (e.g., "access to any site not prohibited is allowed").

Other types of policies can also be enforced, such as ones governing traffic shaping, quality of service, and/or routing (e.g., with respect to a given domain, a pattern including a domain (e.g., *.examplenews.com), a category associated with a domain, other hostname-associated information (e.g., URL), IP address range, etc.). Yet other examples of policies include security policies such as ones requiring the scanning for threats in incoming (and/or outgoing) email attachments, screening of website content, scanning files exchanged through instant messaging programs, and/or other file transfers. In some embodiments, data appliance 102 is also configured to enforce policies with respect to traffic that stays within enterprise network 140.

In various embodiments, other devices are also included in enterprise network 140, such as a mobile device management (MDM) server 162, which is in communication with data appliance 102. MDM server 162 communicates with mobile devices to determine device status and to report (e.g., periodically) such mobile device status information to data appliance 102. MDM server 162 can be configured to report the presence of malicious applications installed on client devices, and/or can be configured to receive indications of which applications are malicious (e.g., from data appliance 102, from security platform 122, or combinations thereof). In some embodiments, data appliance 102 is configured to enforce policies against client devices based on information received from MDM server 162. For example, if a client device is determined to have malware installed on it (or other types of unapproved applications), data appliance 102 (working in cooperation with MDM server 162) can deny the client device access to certain enterprise resources (e.g., an Intranet) while allowing other client devices (which do not have malware installed on them) access to those resources.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
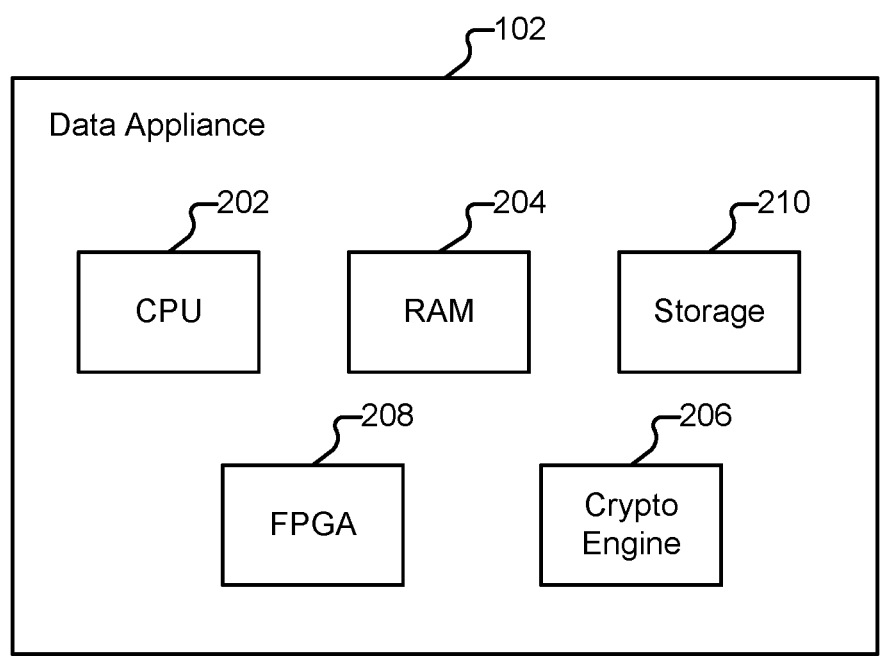
FIG. 2A illustrates an embodiment of a data appliance.

An embodiment of a data appliance is shown in FIG. 2A. The example shown is a representation of physical/hardware components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disk drives or solid state storage units), which can be used to store policy and other configuration information, as well as other information such as signatures and hostname/URL categorization information. In various embodiments, data appliance 102 stores (whether in RAM 204, storage 210, and/or in other appropriate locations) information used in monitoring enterprise network 140 and implementing disclosed techniques. Examples of such information include application identifiers, content identifiers, user identifiers, requested URLs, IP address mappings, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device by software executing on the client device (e.g., endpoint protection applications 152 and 154).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
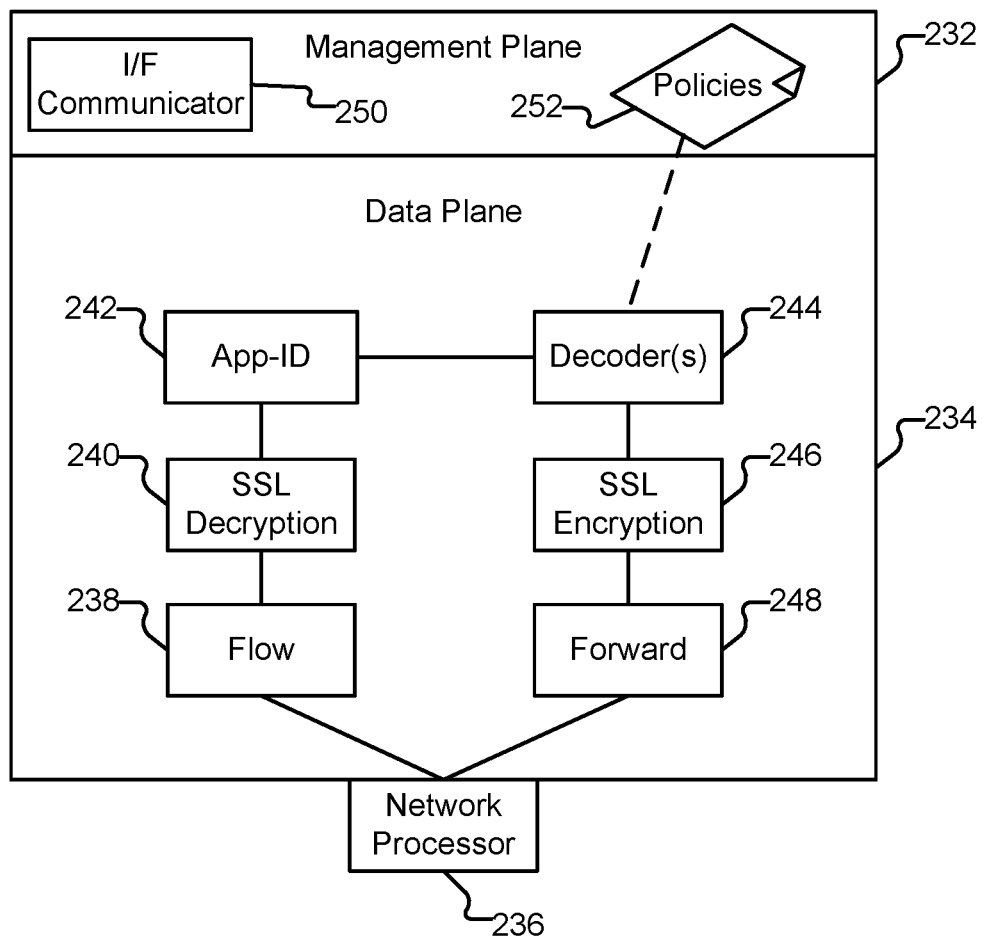
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244. Based on the determination made by application identification engine 242, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, in various embodiments, security platform 122 is configured to provide a variety of services (including to data appliance 102), including analyzing samples (e.g., of documents, applications, etc.) for maliciousness, categorizing applications, testing/auditing applications, categorizing domains/URLs/URIs, etc.

Suppose a malicious individual (using system 120) has created malware 158. The malicious individual hopes that a client device, such as client device 108, will execute a copy of malware 158, compromising the client device, and causing the client device to leak confidential information (e.g., by transmitting the information to malicious server 164). Suppose data appliance 102 has intercepted an email sent (e.g., by system 120) to client device 108 to which a copy of malware 158 has been attached. As an alternate, but similar scenario, data appliance 102 could intercept an attempted download by client device 108 of malware 158 (e.g., from an app store). In either scenario, data appliance 102 determines whether a signature for the file (e.g., the email attachment or app store download of malware 158) is present on data appliance 102. A signature, if present, can indicate that a file is known to be safe (e.g., is whitelisted), and can also indicate that the file is known to be malicious (e.g., is blacklisted).

If a signature for malware 158 (e.g., an MD5 hash of malware 158) is included in the set of signatures, data appliance 102 can prevent the transmission of malware 158 to client device 108 accordingly (e.g., by detecting that an MD5 hash of the email attachment sent to client device 108 matches the MD5 hash of malware 158). Security platform 122 can also provide to data appliance 102 a list of known malicious domains and/or IP addresses, allowing data appliance 102 to block traffic between enterprise network 140 and server 164 (e.g., where server 164 is known to be malicious). The list of malicious domains (and/or IP addresses) can also help data appliance 102 determine when one of its nodes has been compromised. For example, if client device 108 attempts to contact server 164, such attempt is a strong indicator that client 108 has been compromised by malware (and remedial actions should be taken accordingly, such as by quarantining client device 108 from communicating with other nodes within enterprise network 140).

If no signature for an attachment is found, in various embodiments, data appliance 102 is configured to provide the file for static/dynamic analysis, to determine whether it is malicious and/or to otherwise classify it. In various embodiments, analysis of malware 158 is performed at least partially on premise (e.g., within enterprise network 140). For example, static/dynamic analysis techniques described herein can be provided by a malware analysis module 114 included in data appliance 102. Data appliance 102 can also/instead send a copy of malware 158 to security platform 122 for analysis. Further, security platform 122 can also (or instead) obtain copies of applications for evaluation from sources other than data appliance 102 (e.g., data appliances 136 and/or 148 present in other enterprise networks 166 and/or 168), and/or from other types of sources, such as app store 152. Example embodiments of app store 152 include Google Play, iOS App Store, Windows Store, and Amazon Appstore. Yet another way security platform 122 can obtain samples for analysis is by using a crawler 138 configured to periodically crawl app store 152 (or other sources of apps, such as website 134), looking for new or updated applications. Such applications can then be analyzed by security platform 122. In some embodiments, app store 152 (and/or website 134) makes copies of applications available to security platform 122 via an Application Programming Interface (API) made available by security platform 122, instead of or in addition to crawler 138 obtaining such copies. Further, in various embodiments, components of security platform 122 and/or malware analysis module 114 can also be incorporated into app store 152 (and/or website 134).

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliance 102 can be configured to automatically block the file download based on the analysis result. Further, a signature can be generated for the malware and distributed (e.g., to other data appliances such as data appliances 136 and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 (and/or to MDM server 162) as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks (e.g., networks 166 and 168) and their own respective data appliances (e.g., appliances 136 and 148), can contract with the operator of security platform 122. Other types of entities can also make use of the services of security platform 122. For example, an Internet Service Provider (ISP) and/or cellular service provider providing communications services to client device 112 can contract with security platform 122 to analyze applications which client device 112 attempts to download. As another example, the owner of client device 112 can install software 154 on client device 112 which communicates with security platform 122 (e.g., to receive content packages from security platform 122 and transmit applications to security platform 122 for analysis).

In various embodiments, security platform 122 is configured to collaborate with one or more third-party services. As one example, security platform 122 can provide malware scanning results (and other information, as applicable) to a third-party scanner service 172 (an example of which is VirusTotal). Cloud security service 122 can similarly incorporate information obtained from a third-party scanner service (e.g., maliciousness verdicts from entities other than cloud security service 122) into its own information (e.g., information stored in database 146 or another appropriate repository of information).

IV. Analyzing Samples Using Static/Dynamic Analysis

Figure 3:
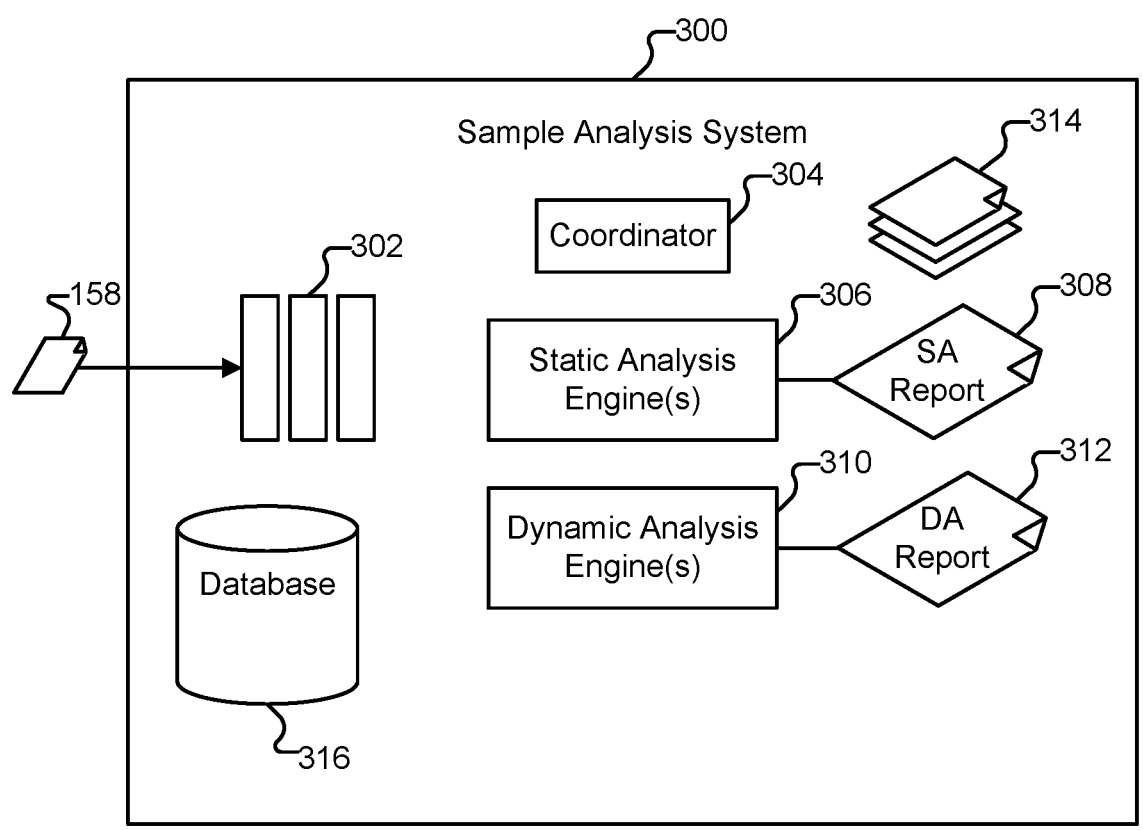
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries. In various embodiments, collection 314 includes a list (or other appropriate data structure) of sensitive code segments.

As will be described in more detail below, in various embodiments, analysis system 300 is configured to perform a two-part analysis on applications, including by performing static and dynamic analysis. The two-phase approach helps improve the accuracy of malware detection, while lowering the false positive rate of mislabeling benign applications as malware (e.g., due to harmless but poor programming techniques on the part of the application's author; due to including a common third party library, such as a legitimate advertising library, that requires permissions not otherwise used by the application; and/or due to legitimate uses of sensitive API calls). The two-phase approach also helps mitigate attempts (e.g., through code obfuscation) by authors of malicious applications to conceal the malicious behaviors of their applications.

A. Ingestion

In various embodiments, when a new sample is received for analysis (e.g., an existing signature associated with the sample is not present in analysis system 300), it is added to queue 302. As shown in FIG. 3, application 158 is received by analysis system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 158). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308).

Examples of collected information include: the package name, shared UID, APK file signer information, permissions claimed, and sensitive API calls included in the source (e.g., sending or erasing SMS messages, accessing the phonebook, and tracking user location changes). Function call graph and/or System Component Dependency Graph (SCDG) information can also be included. The static analysis engine also collects and stores information pertaining to the running context of the sample, such as: the minimum version of the Android OS required to run the application (the minimum SDK version), and the sensors it will have access to. The static analysis engine also evaluates various components of the sample and includes information pertaining to the evaluation in the report as well.

Static analysis can be used to identify the presence of "sensitive code segments" in the APK. A sensitive code segment is one or more API calls (or other code elements) that involve a potentially sensitive/exploitable permission/resource. Examples in a mobile device context include sending SMS messages, capturing video, reading contacts, reading device location, reading device phone number, and installing a package. Other examples of sensitive code segments include (e.g., for Windows applications) checking the system registry, and (e.g., for Linux applications) attempting to modify init.rc.

The presence of a sensitive code segment in an APK indicates that the APK can potentially take a sensitive action/perform a sensitive function. A sensitive code segment can be present in an APK for a variety of reasons. As a first reason, the sensitive code segment may be included as a legitimate (and desired) behavior of a benign application. For example, a video editing application may legitimately require the ability to record video, and would accordingly include a sensitive code segment providing such functionality. A malicious application can also include a sensitive code segment. For example, a malicious flashlight application might be authored to include a sensitive code segment that allows the flashlight application to determine an unsuspecting device owner's location or surreptitiously activate the microphone and eavesdrop on the device user.

The mere presence of one or more sensitive code segments in an application is generally not dispositive of whether or not an application is malicious. As mentioned above, there are often legitimate (and desirable) reasons for such code segments to be included in an application. For example, a contact manager application will legitimately require access to a user's contacts in order to function. As another example, suppose an application author includes in an application a library (or toolkit, or other code, as applicable) that makes available a variety of functions (including sensitive ones). The application itself may not make use of all (or any) of the sensitive code segments included in the library. Flagging all applications which include sensitive code segments as malicious will generally result in a large number of false positives. In various embodiments, analysis system 300 evaluates the context in which a sensitive code segment is included in an application and uses the contextual information to help determine whether the application is malicious or not. Further, information collected by analysis system 300 can be exported as "evidence" to support verdicts about applications. For example, rather than merely labeling a particular application as "benign" or "malicious," evidence for reaching that verdict can be provided, such as, "malicious: application exports contacts without user interaction."

During static analysis, a call graph can be constructed and examined with respect to sensitive code segments. In particular, a determination can be made about how sensitive code segments can potentially be called (if at all) by an executing application, and heuristics can be employed to help determine whether an application is malicious or not. As one example, suppose an application includes a sensitive code segment, but according to the call graph the sensitive code segment is never called. As explained above, one reason for this is that the sensitive code segment is included in an SDK that is incorporated into the application, but the sensitive code segment itself is not used by the application. Such a non-executable sensitive code segment can be considered dead code, and the presence of the sensitive code in the application can be treated as benign accordingly. As another example, where the call graph for an application does indicate that sensitive code segments are called, the call path(s) to the sensitive code segment can be examined. If the sensitive code segment is only called in response to a user interaction, an assumption can be made that the user was aware of (and/or consented to) the sensitive behavior. If the sensitive code segment is instead called on startup (or otherwise executed without user input), an assumption can be made that the sensitive behavior is being hidden from the user (e.g., nefariously). A verdict (e.g., benign or malicious) can be assigned to each path to the sensitive code segment in the application during static analysis (e.g., based on how the code segment is called).

A previously mentioned, the static analysis engine can form an overall verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Static Analysis Example—.apk File

One example of how static analysis can be performed, using an Android .apk file as an example, is as follows. Similar approaches can be used for other types of samples (e.g., iOS applications and Windows applications). First, static analysis engine 306 unzips the .apk (also referred to herein as a "host application" or "host APK") and uses a reverser tool (or set of tools), such as dex2jar or Android Apktool, to reverse the resulting .dex file from Dalvik bytecode into Java bytecode. The output of the reversing operation is, in some embodiments, a set of .smali files—the direct output of the disassembly from Java virtual machine language, and other resource files included in the game.apk file.

An example representation of .smali information of a game made by a fictional company called ACME Games is shown in FIG. 5. Region 502 depicts various Google/Android libraries. Region 504 depicts a programming and configuration model for enterprise applications. Region 506 is a library that provides for advertisements, utilities, and statistics. Region 508 is a library that provides advertisements and statistics. Region 510 is a library that provides utilities, statistics, and application management. Regions 512 and 514 are libraries that provide advertisements and statistics. Region 516 is a library that provides utilities, statistics, and application management. Region 518 is where the actual game code is found. Region 520 depicts a programming and configuration model for enterprise applications. Region 522 is a library that provides utilities. Region 524 includes malicious code.

The static analysis engine retrieves (e.g., from database 146) a set of heuristic rules to be applied on the .smali code and resource files. In particular, static analysis engine 306 determines which rules are triggered (also referred to as "feature hits") by the source code. As one example, if the APK has duplicate entry names (e.g., containing two classes.dex files in the same folder within the APK), this indicates an attempt to exploit Android security vulnerability #8219321 (and an appropriate rule is triggered). Examples of other features (and a maliciousness indicator if hit) include the following (where an example of "the host APK" is "game.apk"):

1. "Contains APK file": If the received APK contains other APK files within the package, the host APK is suspicious.
2. "Contains Known Malicious APK File": If there exist other APK files within the package, those included APK files are analyzed separately (e.g., are added to the queue or checked with existing known malicious applications). If any of the included APK files are determined to be malicious, the received APK is considered malicious as well.
3. "Hide Menu Icons": The menu icons are graphical elements placed in the options menu. If the received APK does not have the menu icons or attempts to hide the menu icons, it is suspicious.
4. "File Type Mismatch": If the received APK contains files whose formats do not match their extensions, it is highly suspicious. For example, several Android malware families (e.g., Android.Droiddream family) attempt to hide additional included APK files as database files by naming them with the ".db" extension rather than ".apk." As another example, a file labeled as a ".png" may instead be an ".xml" file used for a command and control channel. However, a legitimate developer may also inadvertently misname a file (or otherwise misname a file without malicious intent).
5. "Contains Executable Files": If the received APK contains executables for the Linux platform (e.g., .elf files), it is suspicious.
6. "Contains Malicious Executable Files": If the included executable files are known malicious files, e.g., known exploit libraries, the received APK is malicious.
7. "Installs Other APKs": If the received APK has the capacity of installing other APK files (e.g., while running in the background), it is suspicious.
8. "Uninstalls Other APKs": If the received APK has the capacity of uninstalling other APK files (e.g., while running in the background), it is suspicious.
9. "Contains Dangerous Shell Commands": If the received APK contains dangerous shell commands (e.g., chmod and su), it is malicious.
10. "Requires Abnormal Permissions": If the received APK requires permissions such as "system debug," or "authenticate accounts," and/or factory adjustments such as setting process limits, it is suspicious.
11. "Contains Phone number": If the received APK contains phone number(s), it is suspicious (e.g., because the application may place calls or text messages to premium numbers).
12. "Contains URLs": If the received APK contains URL(s) within the source code, it is suspicious.
13. "Contains Malicious URL": Any URL(s) found are compared against a list of known malicious sites. If the URL(s) link to malicious site(s), the received APK is malicious.
14. "Contains Autorun.inf File": If the received APK contains an autorun.inf file that is for the Windows platform, it is malicious (e.g., because an attempt will be made by the user's computer to execute the file if the user connects the phone to the computer).
15. "Duplicate Entries": If the APK has duplicate entry names (e.g., containing two classes.dex files in the same folder within the APK) in the file, it is malicious. (E.g., because it is attempting to exploit the Android security vulnerability #8219321.)

D. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310). As will be explained in more detail below, during the dynamic portion of the analysis, runtime behaviors of the application (including network activity) are analyzed.

Each dynamic analysis worker manages a set of one or more device emulators (e.g., running in virtual machines). In some embodiments, results of static analysis (e.g., performed by static analysis engine 306), whether in report form (308) and/or as stored in database 316, or otherwise stored, are provided as input to dynamic analysis engine 310. The static report information can be used to help select/customize the analysis performed by dynamic analysis engine 310, conserving resources and/or shortening the time required to evaluate an application. As one example, if static analysis has concluded that the sample does not have the ability to access SMS messages, during dynamic analysis, the receipt of SMS messages will not be simulated in some embodiments. As another example, if static analysis has concluded that the only access the sample has to a sensitive permission (e.g., the ability to read SMS messages) is via a known-good/commonly-used third party library, certain triggering actions (e.g., the receipt of SMS messages) can similarly not be simulated. As another example, if static analysis has concluded that the application has the ability to access GPS information, during dynamic analysis, various changes in location of the device can be simulated. However, if the application lacks the ability to access GPS information, in some embodiments no location changes will be simulated. Similarly, even where the application has the ability to access GPS information, if that information is only accessed via a common library, in some embodiments no location changes will be simulated.

Dynamic analysis engine 310 can determine which emulator(s) to run based on the minimum operating system version number required by the sample (and determined during static analysis). For example, if the minimum version number is Android 5.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 7.0). Where multiple virtual machine instances are executed at the same time, a single dynamic analysis engine can manage all of the instances, or multiple dynamic analysis engines can be used (e.g., with each managing its own virtual machine instance), as applicable.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

During the dynamic portion of the analysis, behaviors performed by the application are analyzed (e.g., to check whether the application uses its capabilities suspiciously/maliciously when executing). Heuristics can be used in conjunction with dynamic analysis to determine whether a particular behavior (e.g., when executed by a particular library) should be considered malicious. In various embodiments, static analysis results are used to customize dynamic analysis. For example, if static analysis reveals that user interactions are required to trigger a sensitive code segment, such interactions can be simulated during dynamic analysis.

The environment used by dynamic analysis engine 310 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities. Such connections can also be used for other purposes, such as to help classify the application (e.g., an application that streams data from a known video streaming site (e.g., YouTube or Netflix) can be classified as a video streaming app, and an application that communicates with a known pornographic site can be classified as a pornographic app (irrespective of other features it might provide, such as a calculator widget)).

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304). Further, the application can also be classified without/in addition to a maliciousness verdict being made. For example, an embodiment of analysis system 300 can be configured to classify/audit/test applications as using a particular SDK, containing/making use of a particular sensitive code segment, etc., independent of whether or not the application is malicious.

E. Dynamic Analysis Example—.apk File

The dynamic analysis engine/worker begins analysis by preparing and setting up the running environment for the application to be tested. Examples of operations carried out by the dynamic analysis engine/worker at this point include: (1) determining which system services should be started (e.g., simulated motion sensor readings and simulated location changes); and (2) determining a set of simulated user operations that should take place. As previously mentioned, results of static analysis can be used to inform what dynamic analysis is performed. For example, if static analysis determines that a user interaction is included in an execution path to a sensitive code segment, dynamic analysis engine 310 can be set up to simulate such a user interaction. In particular, verdict/path pairs determined by static analysis engine 306 can be used to determine which system events and/or UI events should be simulated during dynamic analysis.

The dynamic analysis engine/worker loads an appropriate emulator (e.g., a qemu image of Android version 5.0) and installs the application to be analyzed. The application is executed and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator.

The environment used by dynamic analysis engine 310 is instrumented/hooked such that behaviors observed while the application is executing are logged as they occur, and which libraries/classes are responsible for which behaviors is tracked (e.g., using a customized kernel that supports hooking and logcat). In some embodiments, the log data is stored as a temporary file by dynamic analysis engine 310. Further, network traffic associated with the emulator is captured (e.g., using pcap). Such log data indicates information such as which class or other subcomponent within the sample was responsible for the sample engaging in a particular behavior. For example, when the sample attempts to send an SMS, or access a device identifier, the path to the sensitive code segment corresponding to that behavior is logged and can be used in further analysis.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Examples of features that can be detected during dynamic analysis (and a maliciousness indicator if hit) include the following (where an example of "the host APK" is again "game.apk"):

1. "Connects To Unknown Websites": If the received APK attempts to connect to an unknown website (e.g., one that is not on a whitelist of known safe websites), it is suspicious.

2. "Connects To Malicious Websites": If the received APK attempts to connect to a known malicious website, it is malicious.
3. "Adds Malicious Bookmarks": If the received APK attempts to add a known malicious website to the bookmarks of a browser, it is malicious.
4. "Installs Other APKs": If the received APK attempts to install other APK files, it is malicious. The APK to be installed can either be included within the original (received) APK file, or downloaded by the received APK from a remote server.
5. "Uninstalls Other APK": If the received APK attempts to uninstall other installed apps, it is malicious.
6. "Uninstalls Itself": If the received APK attempts to uninstall itself after installation, it is malicious.
7. "Sends SMS In Background": If the received APK attempts to send SMS messages while running in the background, it is malicious.
8. "Inserts SMS To Inbox": If the received APK attempts to insert an SMS message into the Inbox (e.g., while running in the background), it is malicious.
9. "Deletes SMS From Inbox": If the received APK attempts to delete one or more SMS messages present in the Inbox, it is malicious.
10. "Sends SMS To Contacts": If the received APK attempts to send multiple contacts automatically, it is malicious.
11. "Auto Replies To SMS": If the received APK attempts to send an SMS upon receiving an SMS, it is malicious.
12. "Adds APN Settings": If the received APK attempts to insert new APN settings, it is suspicious.
13. "Calls Sensitive Service": If the received APK attempts to call sensitive system services or execute dangerous shell commands (e.g., the "mount" command), it is malicious.
14. "Loads Malicious File": If the received APK loads one or more files when running, the loaded files will be checked separately. If the loaded files are malicious, then the received APK is malicious.
15. "Creates APK Files": If the received APK attempts to save other APK files in one of the system folders (e.g., "/system/app" or "/data/app"), it is suspicious. The saved APK files will be checked separately.
16. "Creates Malicious Files": If the received APK attempts to create a file with a sensitive file type, such as .elf or autorun.inf, it is malicious.
17. "Accesses Hidden Folders Or Files": If the received APK attempts to create or access hidden folders or files on the local storage and outside its own local storage folder, it is malicious. An example of a hidden folder is "./.hidden/."
18. "Changes File Permissions": If the received APK attempts to change the default permissions of local files to "executable," and this file has not been checked in static analysis, or has been determined to be malicious in static analysis, it is malicious.

F. Example Process Performed by Sample Analysis System

Figure 4:
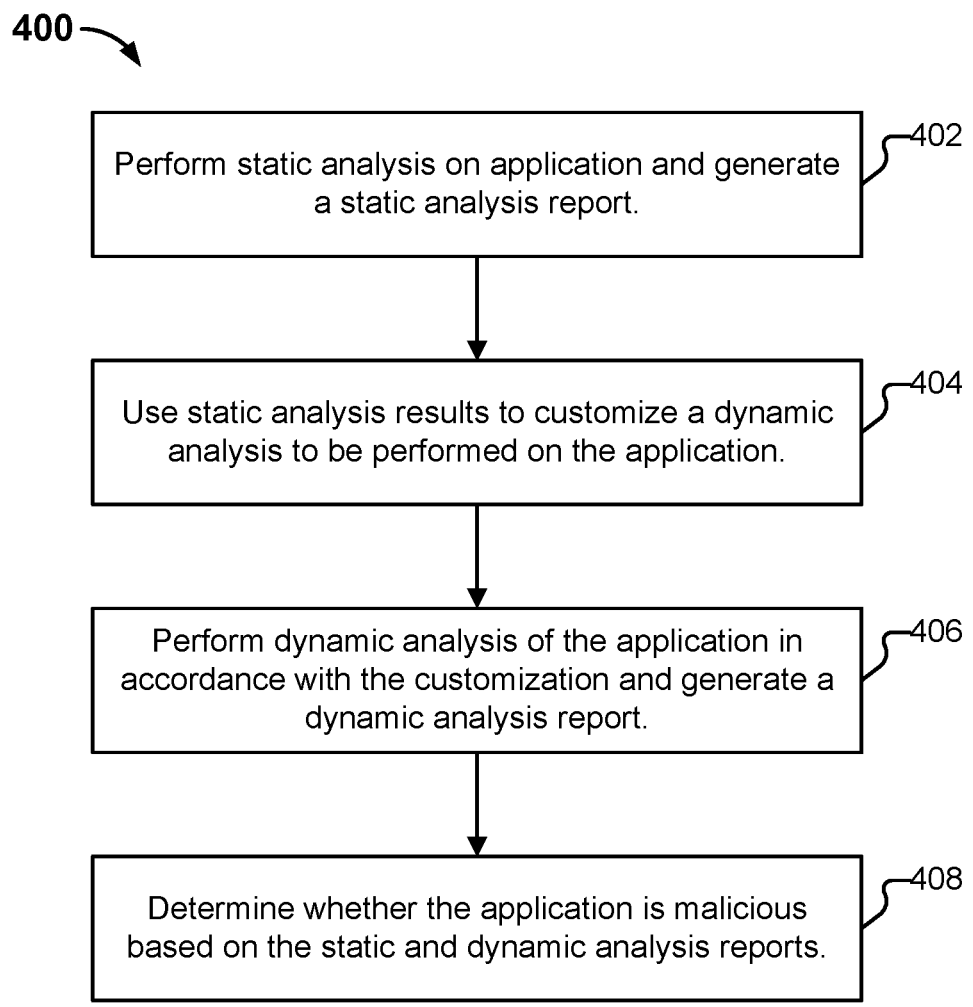
FIG. 4 illustrates an embodiment of a process for determining whether a sample is malicious.

FIG. 4 illustrates an embodiment of a process for determining whether a sample is malicious. In various embodiments, process 400 is performed by analysis system 300. The process begins at 402 when static analysis is performed on a sample. As one example, static analysis is performed on "game.apk" by a static analysis engine 306 at 402. Suppose "game.apk" is malicious and will delete all of the SMSes in a user's Inbox if the device it is running on receives an SMS from ChinaMobile's service number (e.g., "10086"). The application does this to hide notifications pertaining to phone billing from the end user, so that the end user will not be alerted to atypical spending patterns (e.g., premium SMS purchases). During static analysis, a determination will be made that the game.apk application has access to SMS content. This capability of the application (along with other information, examples of which are provided above) is included in a static analysis report by the static analysis engine. At 404, the static analysis report is used to customize a dynamic analysis to be performed on the sample. As one example, since the application has access to SMS content, the dynamic analysis will be customized to include sending a variety of SMS messages. Other device resources to which the application does not have access (e.g., GPS location information) are not simulated (in various embodiments), for efficiency, and thus can be excluded from the customized dynamic analysis plan. At 406, dynamic analysis of the application is performed using a dynamic analysis engine. One example of the dynamic analysis performed includes sending SMSes appearing to originate from a variety of sources, including 10086 (i.e., the service number of ChinaMobile) to the emulator. Sending such an SMS is an example of an "external event" (as is a simulated location change)—contrasted with an "internal event" (e.g., where button presses or file opens/closes are simulated). When game.apk deletes the SMS Inbox upon receiving the simulated incoming SMS from ChinaMobile, the game.apk's actions will be captured and logged. The dynamic analysis engine will examine the logged behavior in conjunction with creating a dynamic analysis report—and determine that the application has taken a malicious action with respect to SMS messages.

Finally, at 408 a determination is made as to whether the sample application is malicious, based on the static and dynamic analysis reports. In this example, coordinator 304 examines the static analysis report (concluding that the application is "suspicious") and dynamic analysis report (concluding the application is "malicious") and determines that game.apk is malicious. In some cases, static analysis engine 306 might conclude an application is malicious, while dynamic analysis engine 310 might conclude the application is merely suspicious. In various embodiments, the final decision rendered by analysis system 300 uses the more severe of the two assessments (e.g., concluding the application is malicious based on the static analysis report). In various embodiments, the final verdict is determined by coordinator 304 assigning points to each of the features triggered by the application (i.e., both the static features and the dynamic features). If the score exceeds a threshold, the application is determined to be malicious. More sophisticated scoring rubrics can also be used in conjunction with the techniques described herein, such as ones which weight dynamic analysis results more heavily than static analysis results.

In some embodiments, coordinator 304 (or another appropriate component) is configured to revise one or more heuristics based on process 400. As one example, static analysis engine 306 might determine that a given application is configured to send an SMS message, but static analysis engine 306 is unable to determine whether the SMS is in fact malicious (e.g., to a 900 number). One reason static analysis engine 306 might not know that the SMS is malicious is because the number is encoded in a way not previously seen by analysis system 300. Another reason static analysis engine 306 might not know the SMS is malicious is because the number is fetched from a URL included in the application (but not known to analysis system 300 to be a malicious URL). During dynamic analysis of the application, a determination might be made that the number to which the SMS is sent is in fact malicious (e.g., by comparing log information against a collection 314 of malicious/premium numbers). The static analysis rules can be revised to indicate that, in the future, if the encoded information representing the 900 number is encountered in any new applications, those applications are malicious (rather than suspicious). As another example, collection 314 can be refined to include the URL as known malicious. When a future application is evaluated by static analysis engine 306 that includes the URL, the static analysis engine will conclude that the application is malicious (instead of suspicious) based on the presence of the URL in collection 314.

V. Additional Detail on Embodiments of Dynamic Analysis Engines

A. Emulator Launching, Application Installation, and Log Reporting

Figure 6A:
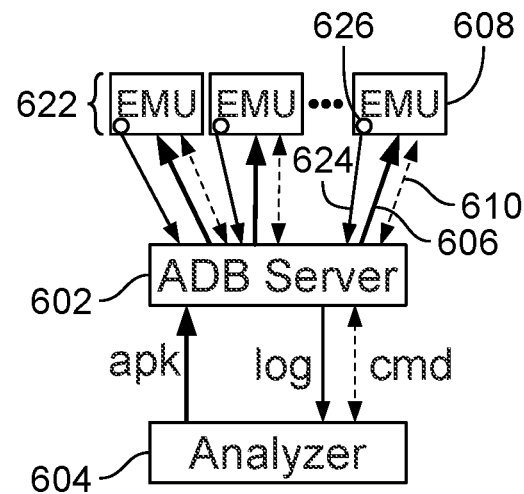
FIG. 6A illustrates an embodiment of an architecture for application testing.
Figure 6B:
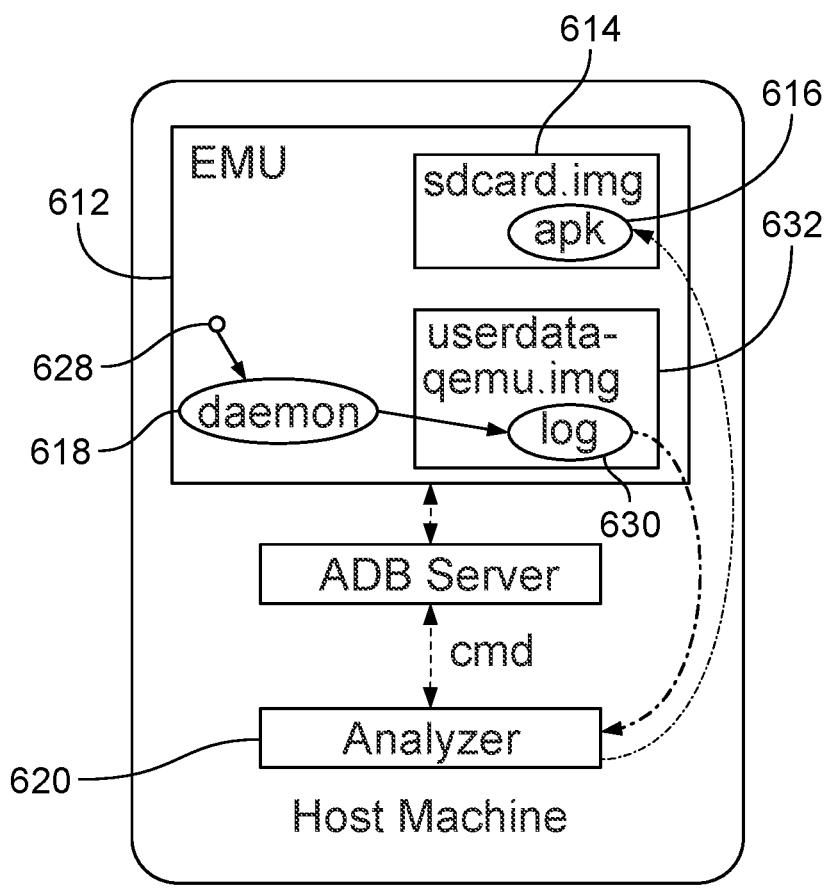
FIG. 6B illustrates an embodiment of an architecture for application testing.

FIGS. 6A and 6B depict, respectively, two examples of architectures that can be used by embodiments of a dynamic analysis engine. Analyzers 604 and 620 are examples of embodiments of dynamic analysis engine 310. In the architecture depicted in FIG. 6A, to install an application for testing, an adb server 602 is used by an analyzer (604) to push an application (606) to an emulator (608) and issue an install command (610), invoking the package manager (pm) tool on the emulator to install the application from the emulator's storage. An example command for such an installation is: adb-s<target-device-serial-no> install <path-to-the-apk-file>.

Unfortunately, the "push" procedure can result in a heavy overload on the adb server. A single adb channel is built between analyzer 604 and emulator 608. If multiple emulators 622 are used by analyzer 604, the single channel will be shared by all of those emulators. When multiple applications are pushed, collectively, to those emulators 622, the adb channel can become blocked and make the connection between the analyzer and the emulator(s) unstable. For example, during such a bottleneck, the adb server may be unable to respond to any incoming commands from analyzer 604.

In the architecture depicted in FIG. 6B, a snapshot technique is employed, in which a clean snapshot is captured when an emulator (e.g., qemu) is started with a given base image (e.g., Android_8.img), and a virtualized/simulated SD card is mounted. The snapshot reflects the current running state (prior to any samples being installed) and is saved. Later, during analysis of a given application, an emulator (612) is started from the snapshot and the application (616) is installed from an SD card image (614) (e.g., using pm), bypassing the need to push the application to the emulator using adb and thus removing heavy load on the adb channel. Such an approach speeds up the time it takes to launch the emulator considerably (and thus allows analysis to be performed in a shorter total amount of time, and/or more detailed analysis to be performed in the same amount of time).

Unfortunately, when an emulator is launched from a snapshot, the content of the virtualized SD card image mounted in the snapshot cannot be listed in the typical way it would otherwise be (e.g., on physical device). Instead of being listable via a command such as "ls /sdcard," the SD card image will be mapped to the device/dev/block/vold/179:0 on the emulator, with the data stored at some (not readily apparent) location of that device. One approach to overcoming this situation is as follows. At the time the snapshot is created, a large placeholder application file (e.g., larger than any arbitrary application system 300 will evaluate) with a given name (e.g., "testingsample.apk") is copied to the SD card image to occupy space. Later, during analysis of a given sample (e.g., "game.apk"), an SD card image containing the sample ("game.apk"), renamed as "testingsample.apk," is created by analyzer 620 (e.g., by executing "mcopy-D-o-i <sdcard.img-path><apk-file-path>:1<target-apk-path-in-sdcard>"). Emulator 612 is launched from the snapshot (e.g., via "emulator-avd <emulator-name>-port <emulator-port>-tcpdump<captured-pcap-path>-no-snapshot-save-no-window") and the SD card image 614 is mounted.

To extract the sample ("game.apk," renamed as "testingsample.apk") so that it can be installed on the emulator, a determination is made of: (1) an offset of the file in /dev/block/vold/179:0, and (2) the size of the file. An APK file starts with the chunk of bytes, "504B0304." By searching/dev/block/vold/179:0 for the first occurrence of "504B0304," the offset (for "game.apk" renamed as "testingsample.apk") can be found. With the offset and the file size (whatever the filesize of "game.apk" is), the apk can be dumped from the /dev/block/vold/179:0 device by the emulator. One approach to implementing the dumping functionality is to implement a daemon service that continuously runs in the background once the emulator is launched from a snapshot, and waits to receive a command to start extracting the APK file from the /dev/block/vold/179:0 device. An example of such a command is shown as follows:

```
adb -s <target-device-serial-no> shell setprop <prop_name>
/dev/block/vold/179:0*<path-to-store-extracted-apk>*<offset-of-the-apk>*<apk-size>
```

The dumped file content will then be stored on the emulator locally and the pm service is called to install the app.

Figure 7:
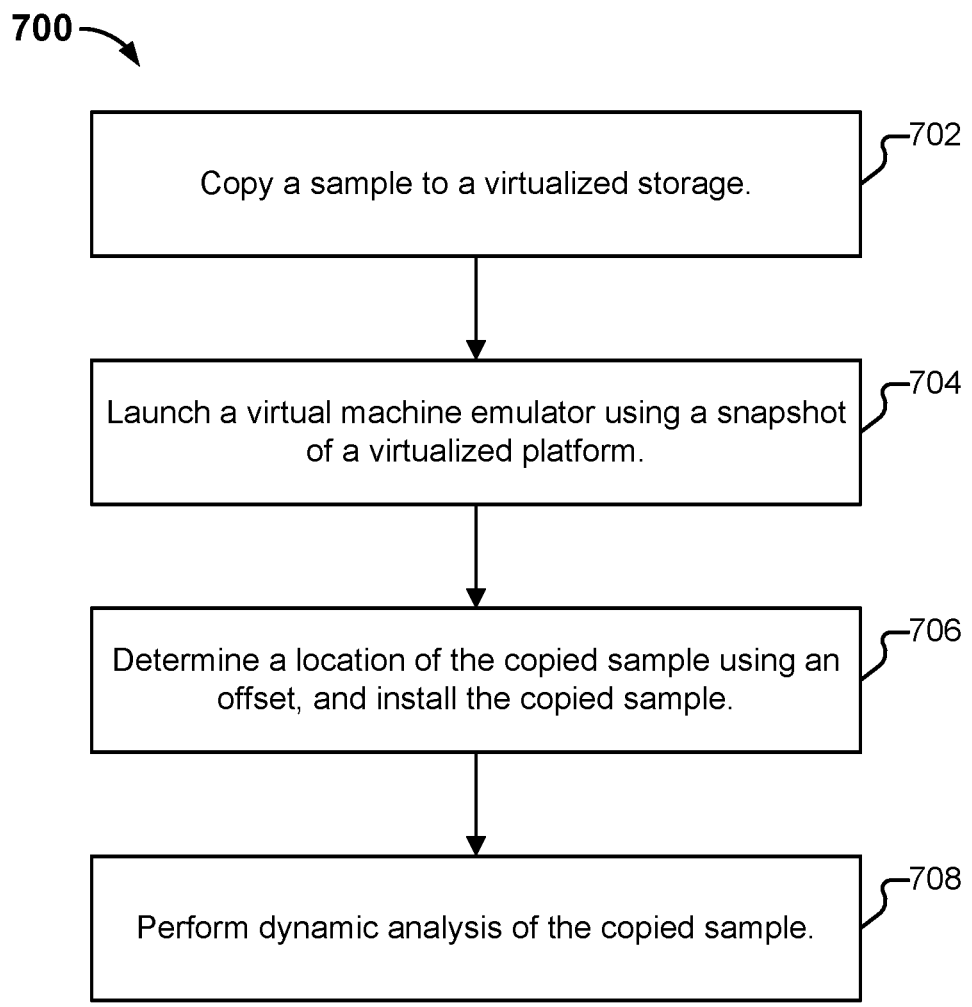
FIG. 7 illustrates an embodiment of a process for performing dynamic analysis on a sample.

FIG. 7 illustrates an embodiment of a process for performing dynamic analysis on a sample. In various embodiments, process 700 is performed by analysis system 300. Further, process 700 is an example of processing that can be performed at 406 in process 400. Process 700 begins at 702 when a sample is copied to a virtualized storage. One example of such processing is described above, where the sample "game.apk" is copied (but named as "testingsample.apk") to an SD card image. At 704, a virtual machine emulator is launched using a snapshot of a virtualized platform. As explained above, an example of such a snapshot can be captured when an emulator is started, and its running state (prior to any samples being installed) is saved to an image file. Also as explained above, a virtualized/simulated SD card can be used by the snapshot (e.g., with a placeholder application included to occupy space for later use by a sample to be installed). At 706, the sample to be analyzed is located. In particular (and as explained above), an offset of the file in the device data can be determined (e.g., by searching for a particular chunk of bytes indicative of the start of an application), and used (along with a file size, as applicable) to locate the sample and dump the sample for installation (e.g., via pm). Once installed, dynamic analysis is performed (708).

During dynamic analysis (additional detail for which is provided above and also below), monitored behaviors and other information (as applicable) are recorded (e.g., using the Android logging system). Returning to FIG. 6A, one way for analyzer 604 to obtain logs 626 from emulator 608 is via the adb channel (624). An example command for redirecting collected log content from the emulator to the host machine through adb is: adb-s<target-device-serial-no> logcat. However, as with installing applications using the adb channel, obtaining logs this way can overload/congest the adb server (602) causing the adb server channel to block/become nonresponsive to other adb commands. An alternate architecture for log collection is depicted in FIG. 6B. In this example, a daemon service 618 is started when the emulator launches. Daemon service 618 is responsible for collecting monitored behavior logs 628 (e.g., from the Android log system) and storing them in the emulator's user data image (632) as logs 630. After dynamic analysis of an application is complete, logs 630 can be directly extracted from data image 632 as stored on the host machine, without using adb.

B. Hooking and Behavior Monitoring

As discussed above, sample analysis system 300 makes use of instrumented/hooked environments so that behaviors observed while an application is executing are logged as they occur. One example of such an environment is a customized version of the Android Open Source Project (AOSP) software stack, in which hooks are added to both the Java framework layer and the native layer.

Examples of framework APIs that can be hooked include: file input/output operations, network connections, process creations, shell command executions, GSM/SMS messaging, cryptography operations, database operations, interprocess communications, dynamic payload loading, etc. For such APIs, hooking can be performed by recording the invoked method and passed in arguments in the body of the target method directly. As one example, to monitor whether an application sends a message at runtime, additional code can be inserted into the AOSP sendTextMessage method body to record the method name, content of message, and destination address. An example of an unmodified sendTextMessage method is depicted in FIG. 8A. FIG. 8B illustrates a modified sendTextMessage which adds hooking in region 802. In line 804, a check is performed to determine whether the method (sendTextMessage) is being invoked by the target application (i.e., the one being analyzed by system 300) or some other application. As another example, by hooking cryptography operations, password change operations, and screen locking APIs, etc., ransomware behavior can be detected.

Hooking adds overhead to dynamic analysis. To minimize the impact introduced by hooking, in various embodiments, a test is performed to make sure that resources are focused on the application being analyzed, and not other benign applications that might also make use of the method such as a system message application. One approach to filtering out logging of invocations from un-targeted apps is to use the Android application user ID. On an Android system, each installed app is assigned a user ID, an example of which is "10031." The user ID to be assigned to a newly installed app is determined by taking the identifier of the most recently previously installed app (e.g., "10030"), and increasing that value by one. Android provides an API to get the app user ID for a given method invocation. Any invocations from apps with an app user ID that doesn't match that of the target can be filtered out. When a method is invoked by the target app, a variety of information is logged, such as the invoked method's class name, method name, and parameters. In various embodiments, the logged information is stored in JSON.

In addition to framework APIs, applications can also make use of native layer functions to perform certain behaviors. One example is a shell execution, which can be performed both with and without invoking a framework API. Such native layer functions can also be hooked. Examples of techniques for hooking native layer functions are as follows. The libc_format_log function (declared in the bionic/libc/private/libc_logging.h header file http://androidxref.com/4.3_r2.1/xref/bionic/libc/private/libc_logging.h#95) writes logs into the /dev/log/main device. This is the same device used by the Log system API in the Java framework. To filter non-target apps and thus only log actions taken by the target app, one approach is to set a system environment value that specifies the target app's user ID.

Some system calls, such as "execve," "socket," and "mlock" are implemented using assembly language. One way to hook such calls is to implement a wrapper in the C language which then redirects to the system call. Using the "execve" function under ARM architecture as an example, below are example steps for implementing such a wrapper.

1. Rename "execve.S" under "bionic/libc/arch-arm/syscalls" to "_execve.S"
2. Modify the word "execve" after ENTRY and END to "_execve"
3. Modify the corresponding "execve.S" entry in the syscalls.mk and/or arm.mk to set the line:
    syscall_src+=arch-x86/syscalls/execve.S
    to
    syscall_src+=arch-x86/syscalls/_execve.S
4. Add the execve.c file to bionic/libc/bionic
5. Add the following execve.c entry to the value libc_common_src_files in bionic/libc/Android.mk:
    libc_common_src_files:=$(syscall_src) unistd/abort.c . . . bionic/execve.c C. Triggering Malicious Behaviors Dynamic analysis can be used to identify behaviors of applications in a variety of situations where static analysis may be less suitable. Examples of situations include code obfuscation, dynamic code loading, and native code adoption, each of which can be handled with dynamic analysis. Dynamic analysis can also be used to detect malicious behaviors that are triggered by the occurrence of particular events as listened for by different components of an application.

As mentioned above, in various embodiments, sample analysis system 300 (e.g., via dynamic analysis engine 310) is configured to orchestrate the simulation of user events such as button presses. One approach for simulating user events is through use of a tool such as the Android Studio UI/Application Exerciser Monkey, a command-line tool that causes a pseudo-random stream of user events to occur in a target environment. Two limitations of using Monkey are that it can be inefficient (e.g., repeatedly triggering already-triggered events), and also potentially miss events a user might take and thus malicious code may lurk (e.g., failing, through random chance, to click on a particular element). Another limitation of Monkey is that it does not simulate non-user events (e.g., system events such battery change status).

As will be described in more detail below, in addition to/instead of relying on a randomness-based tool, such as Monkey, in various embodiments, sample analysis system 300 makes use of more sophisticated techniques, for a more comprehensive approach to uncovering malicious behaviors in applications. Examples of such techniques include using: (1) a programmatic UI interactor, (2) a system event broadcaster, and (3) a component launcher, each of which is described below and can be implemented as a set of scripts authored in an appropriate scripting language.

1. Programmatic UI Interactor

In contrast to a pseudorandom event generator such as the Monkey tool, in various embodiments, dynamic analysis engine 310 includes a programmatic UI interactor. The UI interactor comprises two components: a UI element analyzer and a UI element operator. The UI element analyzer extracts an application's current UI layout into a tree hierarchy of UI elements that includes: UI element type, attributes, and coordinates. Once the UI elements are extracted, the UI element analyzer identifies which UI elements are actionable (e.g., buttons and editable text widgets). The UI element operator is responsible for traversing the tree (e.g., using a depth-first-search approach) and sending corresponding user events to operate the actionable UI element. As one example, the UI element operator sends a "click" event to click an identified button displayed in an interface. More sophisticated UI elements can also be interacted with. For example, suppose a dialog in the application asks a user to input an email address, and that once an email address is submitted (the user enters an email address and then clicks "ok"), malicious behavior is triggered. The UI element analyzer analyzes text fields and determines whether such fields implicate particular inputs (e.g., email addresses, phone number, and password). If so, the UI operator can input appropriately formatted text content (e.g., by selecting data from a list of default inputs for each type of input).

One example way to implement the UI element analyzer/operator is via a script or set of scripts (written in an appropriate scripting language) that make use of the AndroidViewClient tool (https://github.com/dtmilano/AndroidViewClient). AndroidViewClient can fetch UI elements and their layouts (including type information, name information, and coordinates), and can also send actions to a given UI element.

The programmatic UI interactor efficiently avoids repeated interactions by maintaining a history of actions taken by the UI element operator and only taking those actions not previously taken as it traverses the application's UI. The following is an example set of rules that can be used by the programmatic UI interactor when traversing an application's UI. In the following rules, "UI element" includes buttons, edit text, etc., and "Activity" is the UI screen which includes UI elements and their layouts.

1. Are there actionable UI elements to operate? Continue. Otherwise, end the interaction.
2. If the application is not currently visible (i.e., is hidden/running in the background), bring it forward.
3. If the current Activity ID is equal to the previous Activity ID, return to the previous Activity.
4. If the current Activity ID is a new Activity, explore all UI elements and parse the actionable UI elements. For each actionable UI element, parse its type.
5. If there are no remaining actionable UI elements in the current Activity, go back to the previous Activity.
6. When operating a clickable UI element, choose high priority elements (e.g., as defined in PRIORITY_BUTTONS) first by the text content. Clickable UI elements include: "android.widget.textview", "android.widget.imageview", "android.widget.button", "android.widget.imagebutton", "android.view.view", "android.widget.linearlayout". Examples of PRIORITY_BUTTONS=["yes", "ok", "activate", "detail", "more", "check", "agree", "try", "go", "next", "login", "login in", "sign in"]. An example of a low priority button is one labeled "cancel."
7. When operating a radio button element ("android.widget.radiobutton"), analyze the surrounded TextView UI element and choose the radio button with a surrounded "yes" text view.
8. When operating an EditText element ("android.widget.edittext"), analyze the surrounded TextView UI element. If the text is "account", "email", "gmail", "username", "password", (etc.) input corresponding content into it (e.g., by selecting the content from a list of default text entries).

FIG. 9 illustrates an example data structure for storing the UI elements and their layouts for a given screen view (referred to above as an Activity). Each given screen view has a unique identifier ("screen_id"), an activity name ("top_activity"), and a top window identifier ("top_window_id") in the UI layout. All UI element objects are stored in the "views" array. Once the UI type of UI element is identified, the UI element object is assigned to the corresponding UI element type array, such as "edit_views" and "click_views."

FIG. 10 illustrates example implementations of four different types of UI events, including touch, key press, input, and drag. In each of the event types, the UI operator directly invokes the UI element's event function, such as the "touch( )", "press( )" and "input( )" functions, with parameters, such as "input_content", "key_type" and "drag_coordinates".

2. System Event Broadcaster

Some behaviors of applications can only be triggered by system events, such as the SMS receiving event, SMS sending event, incoming phone call event, outgoing phone call event, web browser opening event, app store opening event, reboot, geolocation change, battery status change, etc. In various embodiments, dynamic analysis engine 310 includes a System Event Broadcaster to programmatically supply system events during dynamic analysis.

A large number of system events are possible in an Android system. While one approach to broadcasting system events would be to broadcast every possible event, a more efficient approach is as follows. The System Event Broadcaster analyzes results of static analysis (e.g., performed by a static analysis engine 306 as described above) and generates a list of "effective" system events to be tested. As one example, each Android app includes an "AndroidManifest.xml" file in which the app enumerates the events it would like to know about. An example excerpt from a an app's AndroidManifest.xml file is as follows:

```
<receiver android:name="com.yf.jar.pay.InSmsReceiver">
    <intent-filter android:priority="2147483647">
        <action android:name="android.provider.Telephony.SMS_RECEIVED"/>
    </intent-filter>
</receiver>
```

This portion of the AndroidManifest.xml indicates that the component named "com.yf.jar.pay.InSmsReceiver" will be triggered by the incoming SMS message event (intent action android.provider.Telephony.SMS_RECEIVED).

The System Event Broadcaster can efficiently test for behaviors triggered by system events, by selecting only those system events that the application can respond to (as determined based on static analysis of the application's AndroidManifest.xml). An example way to implement a System Event Broadcaster is via a script written in an appropriate scripting language. To broadcast a system event, the adb tool can be used. One example of such a command is: adb-s<device-serial-no> shell am start-a android.intent.action.SENDTO-e "sms_body" "<sms_body_content>"-e "exit_on_sent" "true"-d "sms:<sms number>", which simulates the sending of an SMS. Another example of such a command is: adb-s<device-serial-no> emu sms pdu<pdu-data-of-the-simulated-sms>, which simulates an incoming SMS message. As another example, a geolocation change event can be simulated with the following command: adb-s<device-serial-no> emu geo fix <longitude><latitude><altitude>. And, the launching of the Google Play app can be simulated as follows: adb-s<device-serial-no> shell am start-a android.intent.action.VIEW-d market://details?id= com.android.chrome.

3. Component Launcher

A given Android application comprises different components, including activity components, broadcast receiver components, and service components. Activity components are responsible for displaying GUI elements and accepting interactions from a user. Broadcast receivers are event driven components which listen for particular system events, such as device booting, battery changes, screen on/off, etc. Services run in the background and perform operations such as file downloads and playing music, etc.

One example way a malicious app could attempt to hide its malicious behavior is through the following. The app defines a broadcast receiver to listen for the device booting event. Once the device has booted, the broadcast receiver is triggered and it further launches a service to perform some malicious behaviors in the background. While such events might otherwise be tested for during dynamic analysis (e.g., receive SMS or location change as described above), in some cases, the events being listened for by the malware (e.g., alert when downloaded file completes) might not.

In various embodiments, sample analysis system 300 (e.g., via dynamic analysis engine 310) is configured to forcibly launch each of the components in an application during analysis. Each of an application's components is predefined in the app's AndroidManifest.xml and are extracted during static analysis (e.g., performed by a static analysis engine 306 as described above). An example portion of an app's AndroidManifest.xml is depicted in FIG. 11. The app defines a receiver named "com.ast.sdk.receiver.ReceiverM" which listens for the USER_PRESENT event. When a user actively interacts with the device, this component will receive that event. Also shown in FIG. 11 are background running services such as "com.secure360.system.SService," "com.yfjar.pay.SmsService," etc. One way to implement a component launcher is as a script authored in an appropriate scripting language. The adb tool can be used to force the launch of a component, and as applicable (and determined during status) supply any necessary input (e.g., where the component is awaiting receipt of an SMS from a particular phone number). Each type of component is launched using a different command:

Activity: adb-s<device-serial-no> shell am start-n<package-name/activity-name>
Service: adb-s<device-serial-no> shell am startservice-n<package-name/service-name>
Broadcast Receiver: adb-s<device-serial-no> shell am broadcast—user 0-a <intent-action>

4. Example Process for Triggering Malicious Behaviors

FIG. 12 illustrates an embodiment of a process for triggering malicious behavior in a sample that is executing in a virtualized environment. In various embodiments, process 1200 is performed by analysis system 300. Process 1200 begins at 1202 when a sample is analyzed to determine a set of events that should be selected for performing/simulating. As one example of the processing performed at 1202, the programmatic UI interactor determines a set of actionable UI elements (examples of the set of events that should be selected for performing). The analysis of a static analysis report 308 by sample analysis system 300 to identify (e.g., within AndroidManifest.xml) those system events of interest to the sample is another example of processing performed at 1202 in accordance with various embodiments of process 1200. At 1204, the set of events selected at 1202 is performed. In the example of the programmatic UI interactor, as the UI element operator takes various actions (e.g., clicking on elements or entering text into text fields), such actions are examples of performing events (1204). Other examples of processing performed at 1204 include dynamic analysis engine 310 via a system event broadcaster simulating system events included in the static analysis report/AndroidManifest.xml and the component launcher similarly launching components included in the static analysis report/AndroidManifest.xml. Finally, at 1206 a maliciousness verdict is determined for the sample. Example ways of determining such a verdict are described in more detail above, in conjunction with discussion of portion 408 of FIG. 4.

D. Emulator Detection Resistance

One approach malware authors use to attempt to evade detection is to employ emulation-detection functionality. In particular, some malware is written to perform a check of whether or not the malware is executing in a virtualized/emulated environment, and if so, to refrain from taking malicious actions. The hope on the part of the malware author is that during dynamic analysis by a malware analysis system, the malware sample will not execute malicious routines, and will erroneously be classified as benign by the malware analysis system.

In various embodiments, sample analysis system 300 (e.g., via dynamic analysis engine 310) is configured to employ emulator detection resistance techniques, to make it more difficult for malware to detect when it is being executed in a virtualized environment. Two examples of such techniques are: (1) emulator feature hiding, and (2) fake data generation.

1. Emulator Feature Hiding

Android emulators have inherent features that will differ from those of real physical devices. As one example, the phone number of an Android emulator has the pattern, "155 5521<emulator-port>." As a second example, the device identifier of an Android emulator is "000000000000000." And, as a third example, certain files are present on the file system of an emulator that would not otherwise be present on a real physical device (e.g., "/dev/socket/qemud"). Accordingly, a malicious Android app could read the phone number of the device at startup, and, if the phone number follows the pattern "155 5521 . . . " the malware could conclude it is being executed in an emulator, and refrain from executing malicious routines. The malware could employ similar techniques to check the device identifier or to check for the presence of emulator-context files on the file system before engaging in malicious behaviors.

In various embodiments, dynamic analysis engine 310 is configured to conceal features indicative of emulation. The following are examples of ways such features can be concealed.

a. Modifying Fingerprints Returned by API Invocations

In order to probe for some indicators of emulation, the malware app makes use of applicable system APIs. For example, "getLine1Number" returns the phone number of the Android device, "getDeviceId" returns the device identifier of the Android device, "getVoiceMailNumber" returns the voice mail number, etc. For each of these APIs (where the returned value will differ between an emulated device and a real physical device), dynamic analysis engine 310 can randomly generate realistic return values (e.g., that conform to the format of values of real physical devices). As one example, each invocation of getLine1Number on an emulator used by system 300 returns a different phone number, and that returned phone number is 11 digits. FIG. 13A illustrates an example of a modified version of the getLine1Number API that can be used by dynamic analysis engine 310. The modification (1302) logs the phone number retrieval behavior and also hides the emulator fingerprint via the hideEmu method. FIG. 13B illustrates an example of a modified version of the getDeviceId API.

As another example, in order to check whether a file is present on a system, malware can make use of the Java.io.File method, and thus determine whether emulator specific files are present. Examples of such emulator specific files include "/dev/socket/qemud," "/dev/qemu_pipe," "/sys/qemu_trace," etc. To protect against this kind of detection, the relevant API can be hooked, and, a determination can be made of whether or not the presence of a particular file (e.g., included on a list of known-emulator specific files) is being performed. FIG. 14A illustrates (at 1402) modification code that can be added to the Android source code to support this protection. If the current file to be checked falls in the list (i.e., is an emulator specific file), a "false" value is returned, indicating that the file is not present on the emulated system (when in fact it is).

b. Modifying Fingerprints in System Static Constant Fields

On Android systems, there exist various static constant fields which can be directly accessed by every application. The values of these constant fields will differ between an Android emulator and a real physical device. Examples of such constants include, in the android.os.Build class, DEVICE, PRODUCT, BRAND, MODEL, etc. The DEVICE value on an emulator defaults to "generic." In various embodiments, dynamic analysis engine 310 uses the Java reflection technique to dynamically set the fields' values at run-time. The new fields' values are first stored in a file and then pushed to the Android emulator via adb push. Such values will then be used to set the target fields by using Java reflection. FIG. 14B illustrates an example way to dynamically change a field value in a given class.

c. Replacing Emulator Specific Files with Real Device Files

Some files exist on both an Android emulator's filesystem and on a real physical device, however, their contents differ. One way a malicious application could determine whether it is running in an emulator is by checking the content of such a file. Examples of such files include "/system/build.prop," "/sys/devices/platform," "/proc/cpuinfo," etc. In order to get the contents of a file, the app first needs to open the file, and then use the returned file handler to access the file's contents. When an app attempts to access a target file (e.g., "/system/build.prop"), the file handler can be redirected to a modified one which corresponds to a version of the file copied from a real device. The application will thus be unable to determine it is running in an emulator by checking file contents.

2. Fake Data Generation

One way a malicious application can attempt to check if it is running in an emulator is to probe the running environment for user footprints. On a physical device used by an actual user, contents such as SMS messages, contacts, in and out phone call histories, photos, etc. should be present. The absence of such contents can signal to a malicious application that it is running in an emulator. Further, certain malicious behaviors (e.g., self-spreading via SMS) can't occur when such data is absent (e.g., when there are no contacts to send SMSes to), irrespective of whether the malware is attempting to determine whether it is running in a virtualized environment or not.

In various embodiments, dynamic analysis engine 310 is configured to disguise emulation by supplying fake SMS messages, contacts, call histories, photos, documents, bookmarks, social apps, etc. on the Android emulator. Such fake data can be randomly generated once the emulator is launched (instead of or in addition to using predefined data). Using the generation of fake contacts an example, the following are an example of steps dynamic analysis engine 310 can take.

1. Randomly generate contacts (e.g., including a first name, last name, and phone number) on the host server, in accordance with a set of rules and example data (e.g., using a predefined list of example first names, example last names, area codes, etc.). The generated contacts are stored in the JSON format locally on the host.

2. Once the Android emulator is fully up, the local file containing the contacts generated in step 1 is pushed to the Android emulator using the command: adb-s<device-serial-no> push <local-fake-contacts-file><file-path-on-emulator>. The local file will be very small and will present very little overhead for the adb channel.

3. An application pre-installed on the Android emulator has a background service which is in charge of fetching the fake contacts from the file and inserting data into the Android system's database. The command to trigger the service to run is: adb-s<device-serial-no> shell am startservice <app-package-name/service-name>.

Similar approaches can be used to copy other types of randomized fake indicia of user use to the device. For example, the host can generate random SMS messages, generate arbitrary call history information, supply randomly generated images (or existing stock images) etc., which can be pushed to the emulator and inserted into the Android system's database as applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   analyze a sample to determine a set of events that should be selected for performing by a dynamic analyzer executing the sample in an instrumented, emulated environment;
   interact with the sample at least in part by: performing the set of selected events and performing a set of emulator detection resistance actions, including by hiding at least one emulator feature; and
   determine a maliciousness verdict for the sample based at least in part on one or more responses taken by the sample in response to the interaction performed by the dynamic analyzer; and
   a memory coupled to the processor and configured to provide the processor with instructions.

2. The system of claim 1, wherein the set of emulator detection resistance actions includes returning a random value in response to receiving a system call.

3. The system of claim 1, wherein the set of emulator detection resistance actions includes modifying a system static constant field.

4. The system of claim 1, wherein the set of emulator detection resistance actions includes receiving a file open request from the sample, determining that the file is on a list, and redirecting a file handler associated with the file.

5. The system of claim 1, wherein the set of emulator detection resistance actions includes generating artificial user data.

6. The system of claim 5, wherein the artificial user data includes artificial contacts.

7. The system of claim 5, wherein the processor is further configured to detect when the sample attempts to access at least some of the artificial user data and in response log the attempted access.

8. The system of claim 1, wherein determining the set of events includes evaluating user interface elements of the executing sample.

9. The system of claim 8, wherein evaluating the user interface elements includes determining which elements are actionable.

10. The system of claim 9, wherein determining which elements are actionable includes determining which elements have previously been interacted with.

11. The system of claim 8, wherein performing the set of selected events includes interacting with at least one user interface element.

12. The system of claim 1, wherein analyzing the sample includes evaluating a manifest file.

13. The system of claim 1, wherein performing the set of selected events includes simulating a system event.

14. The system of claim 1, wherein performing the set of selected events includes forcibly launching a component.

15. A method, comprising:
    analyzing a sample to determine a set of events that should be selected for performing by a dynamic analyzer executing the sample in an instrumented, emulated environment;
    interacting with the sample at least in part by: performing the set of selected events and performing a set of emulator detection resistance actions, including by hiding at least one emulator feature; and
    determining a maliciousness verdict for the sample based at least in part on one or more responses taken by the sample in response to the interaction performed by the dynamic analyzer.

16. The method of claim 15, wherein the set of emulator detection resistance actions includes returning a random value in response to receiving a system call.

17. The method of claim 15, wherein the set of emulator detection resistance actions includes modifying a system static constant field.

18. The method of claim 15, wherein the set of emulator detection resistance actions includes receiving a file open request from the sample, determining that the file is on a list, and redirecting a file handler associated with the file.

19. The method of claim 15, wherein the set of emulator detection resistance actions includes generating artificial user data.

20. The method of claim 19, wherein the artificial user data includes artificial contacts.

21. The method of claim 19, further comprising detecting when the sample attempts to access at least some of the artificial user data and in response logging the attempted access.

22. The method of claim 15, wherein determining the set of events includes evaluating user interface elements of the executing sample.

23. The method of claim 22, wherein evaluating the user interface elements includes determining which elements are actionable.

24. The method of claim 23, wherein determining which elements are actionable includes determining which elements have previously been interacted with.

25. The method of claim 22, wherein performing the set of selected events includes interacting with at least one user interface element.

26. The method of claim 15, wherein analyzing the sample includes evaluating a manifest file.

27. The method of claim 15, wherein performing the set of selected events includes simulating a system event.

28. The method of claim 15, wherein performing the set of selected events includes forcibly launching a component.

* * * * *